(12) United States Patent  
Hassan et al.

(10) Patent No.: US 6,543,719 B1  
(45) Date of Patent: Apr. 8, 2003

(54) OSCILLATING AIR JETS FOR IMPLEMENTING BLADE VARIABLE TWIST, ENHANCING ENGINE AND BLADE EFFICIENCY, AND REDUCING DRAG, VIBRATION, DOWNLOAD AND IR SIGNATURE

(75) Inventors: Ahmed A. Hassan, Mesa, AZ (US); Friedrich K. Straub, Mesa, AZ (US); David B. Domzalski, Gilbert, AZ (US)

(73) Assignee: McDonnell Douglas Helicopter Co., Mesa, AZ (US)

(*) Notice: Subject to any disclaimer, the term of this patent is extended or adjusted under 35 U.S.C. 154(b) by 0 days.

(21) Appl. No.: 09/198,800

(22) Filed: Nov. 24, 1998

Related U.S. Application Data

(63) Continuation-in-part of application No. 08/869,725, filed on Jun. 5, 1997, now Pat. No. 6,092,990, and a continuation-in-part of application No. 08/869,372, filed on Jun. 5, 1997, now Pat. No. 5,938,404.
(60) Provisional application No. 60/071,140, filed on Jan. 12, 1998, and provisional application No. 60/071,142, filed on Jan. 12, 1998.

(51) Int. Cl.⁷ .............................................. B64C 27/04
(52) U.S. Cl. .................. 244/17.13; 244/208; 244/76 R; 244/7 A; 416/42; 416/3; 416/90 A; 415/119
(58) Field of Search ............................ 244/1 N, 7 R, 244/7 A, 7 B, 198, 199, 200–204, 207, 208, 209, 76 R, 76 C, 17.11, 17.13; 416/3, 42, 90 A, 91, 500; 415/119

(56) References Cited

U.S. PATENT DOCUMENTS

| | | |
|---|---|---|
| 2,071,012 A | 2/1937 | Adams |
| 2,376,834 A | 5/1945 | Thompson |
| 2,397,132 A | 3/1946 | Dent, Jr. |
| 2,638,990 A | 5/1953 | Pitcairn |
| 2,892,502 A | 6/1959 | Donovan |
| 3,055,614 A | 9/1962 | Thompson |
| 3,262,658 A | 7/1966 | Reilly |
| 3,451,644 A | 6/1969 | Marchetti et al. |
| 3,509,971 A | 5/1970 | Gerstine et al. |
| 3,588,273 A | 6/1971 | Kizilos |
| 3,612,444 A | 10/1971 | Girard |
| 3,713,750 A | 1/1973 | Williams |
| 3,820,628 A | 6/1974 | Hanson |
| 3,954,229 A | 5/1976 | Wilson |
| 4,169,567 A | 10/1979 | Tamura |
| 4,228,379 A | 10/1980 | Guscott et al. |
| 4,386,241 A | 5/1983 | Maeda |

(List continued on next page.)

FOREIGN PATENT DOCUMENTS

| | | |
|---|---|---|
| JP | 61-88699 | 5/1986 |
| RU | 1761973 | 9/1992 |

*Primary Examiner*—Galen L. Barefoot  
(74) *Attorney, Agent, or Firm*—Stout, Uxa, Buyan & Mullins, LLP; Donald E. Stout

(57) ABSTRACT

A porous surface on an aircraft structure driven with oscillating positive and negative pressures is used as an active control device for attenuating negative aerodynamic interactions. The porous surfaces can be driven with positive and negative pressures either continuously or when predetermined flight conditions are present. The porous surfaces can be used on rotor blades to reduce BVI noise in descent flight conditions. The porous surfaces can be configured on rotor blades for affecting blade variable twist in accordance with various flight conditions, and can further be incorporated for reducing rotor hub vibrations as well. Porous surfaces placed on aerodynamic surfaces below the rotor blades of a tiltrotor aircraft can attenuate or eliminate download and fountain flow conditions. When placed on the trailing edges of a tip jet-exhaust driven rotor blade, the porous surfaces of the present invention can supplement the tip jet momentum of the exhaust to thereby reduce an amount of exhaust needed to drive the rotor blade.

111 Claims, 11 Drawing Sheets

U.S. PATENT DOCUMENTS

| | | | |
|---|---|---|---|
| 4,514,143 A | | 4/1985 | Campbell |
| 4,516,747 A | | 5/1985 | Lurz |
| 4,534,702 A | | 8/1985 | Johnson, Jr. et al. |
| 4,580,210 A | | 4/1986 | Nordstrom |
| 4,693,201 A | * | 9/1987 | Williams et al. ............ 244/208 |
| 4,706,902 A | | 11/1987 | Destuynder et al. |
| 4,786,836 A | | 11/1988 | Tokushima |
| 4,799,859 A | | 1/1989 | Zimmer |
| 4,802,642 A | | 2/1989 | Mangiarotty |
| 4,989,810 A | | 2/1991 | Meier et al. |
| 5,031,222 A | | 7/1991 | Takaya |
| 5,082,207 A | * | 1/1992 | Tulinius ................... 244/76 R |
| 5,320,491 A | | 6/1994 | Coleman et al. |
| 5,335,885 A | | 8/1994 | Bohning |
| 5,437,419 A | | 8/1995 | Schmitz |
| 5,457,630 A | | 10/1995 | Palmer |
| 5,529,458 A | | 6/1996 | Humpherson |
| 5,562,414 A | | 10/1996 | Azuma |
| 5,588,800 A | | 12/1996 | Charles et al. |
| 5,613,649 A | * | 3/1997 | Schlinker et al. ........... 244/204 |
| 5,747,906 A | | 5/1998 | Tajima et al. |
| 5,758,823 A | | 6/1998 | Glezer et al. |
| 5,791,601 A | | 8/1998 | Dancila et al. |
| 5,803,410 A | | 9/1998 | Hwang |
| 5,804,906 A | | 9/1998 | Tsutsumi |
| 5,806,808 A | | 9/1998 | O'Neil |
| 5,813,625 A | * | 9/1998 | Hassan et al. ........... 244/17.11 |
| 5,938,404 A | | 8/1999 | Domzalski et al. |
| 5,957,413 A | | 9/1999 | Glezer et al. |
| 6,092,990 A | | 7/2000 | Hassan et al. |
| 6,109,566 A | * | 8/2000 | Miller et al. ................. 244/207 |

* cited by examiner

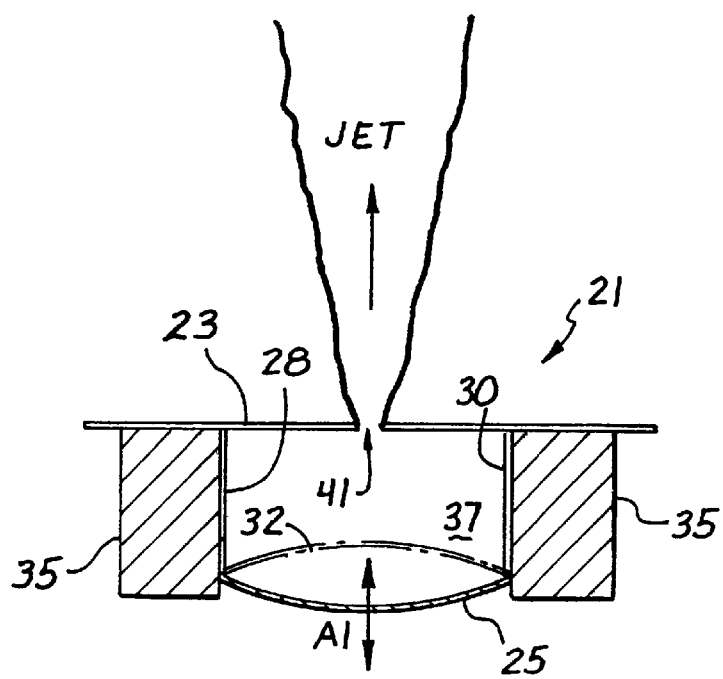
Fig. 1
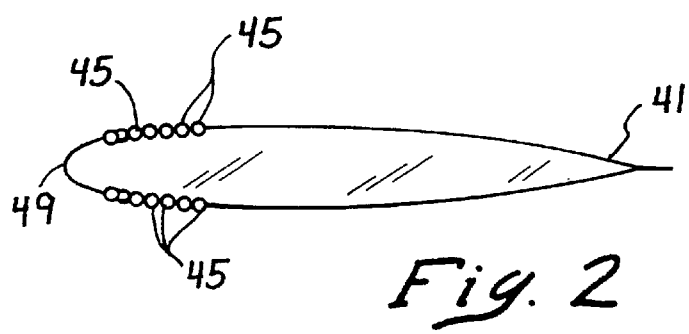
Fig. 2
Fig. 3
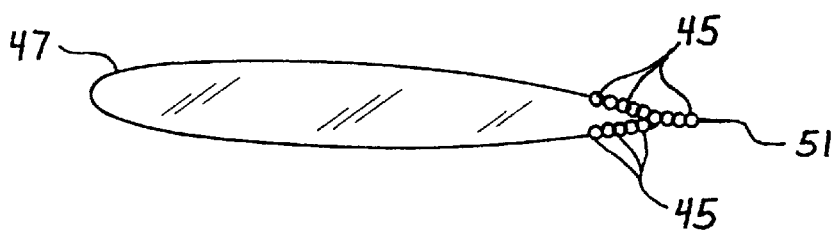

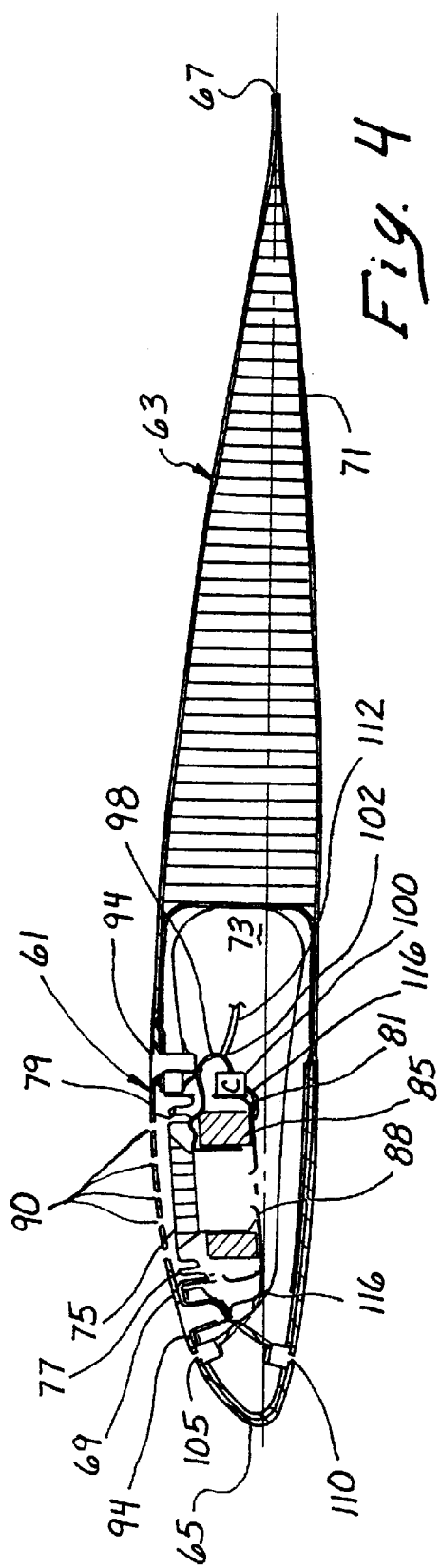
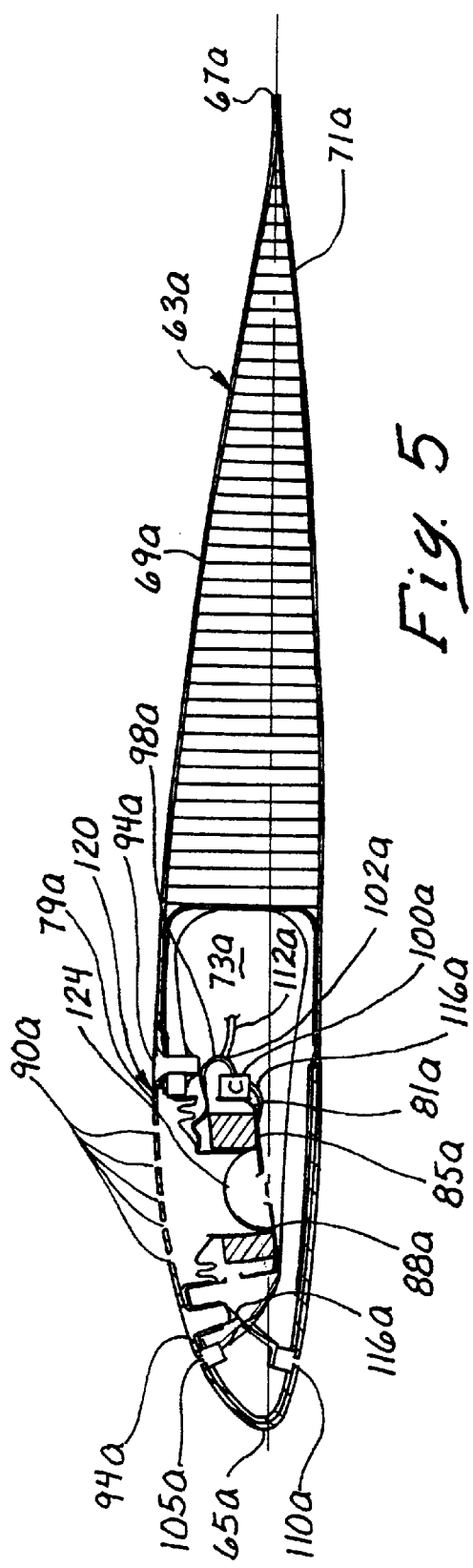

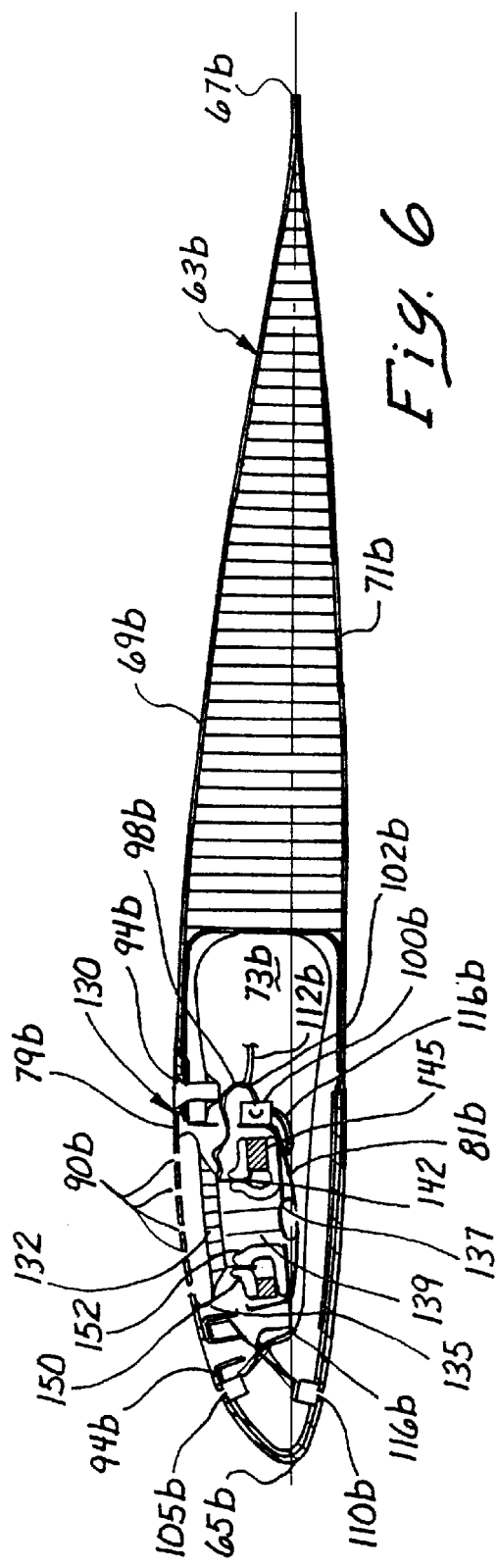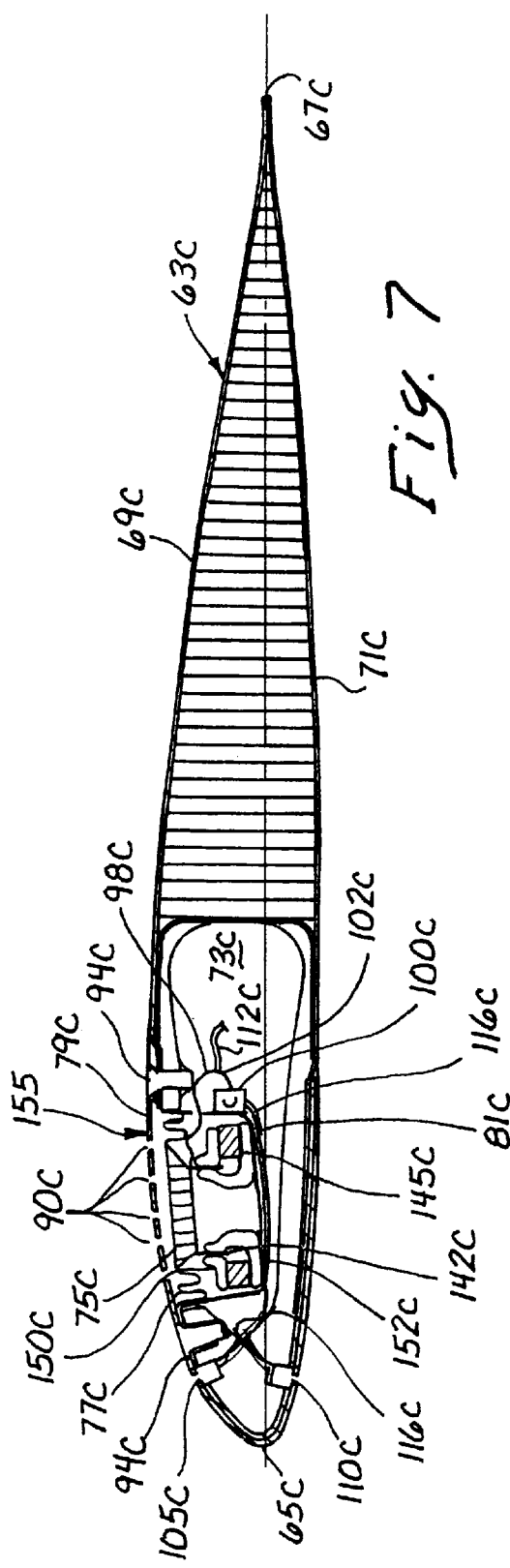

OSCILLATING AIR JETS FOR IMPLEMENTING BLADE VARIABLE TWIST, ENHANCING ENGINE AND BLADE EFFICIENCY, AND REDUCING DRAG, VIBRATION, DOWNLOAD AND IR SIGNATURE

This application claims the benefit of Provisional Application No. 60/071,140, entitled ZERO-MASS AIR JETS FOR CONTROL AND BVI NOISE REDUCTION, filed Jan. 12, 1998; and Provisional Application No. 60/071,142, entitled REDUCING SHOCK WAVE STRENGTH/HSI NOISE USING ZERO-MASS JETS, filed Jan. 12, 1998; the contents of which are expressly incorporated herein by reference.

This application is a continuation-in-part of U.S. application Ser. No. 08/869,725, filed on Jun. 5, 1997 now U.S. Pat. No. 6,092,990 and entitled OSCILLATING AIR JETS FOR HELICOPTER ROTOR AERODYNAMIC CONTROL AND BVI NOISE REDUCTION; and U.S. application Ser. No. 08/869,372, filed on Jun. 5, 1997 now U.S. Pat. No. 5,938,404 and entitled OSCILLATING AIR JETS ON AERODYNAMIC SURFACES; both of which are commonly assigned and the contents of which are expressly incorporated herein by reference.

This application is related to U.S. application Ser. No. 08/251,329, filed on May 31, 1994 and entitled BLADE VORTEX INTERACTION NOISE REDUCTION TECHNIQUES FOR A ROTORCRAFT, which issued into U.S. Pat. No. 5,588,800; co-pending U.S. application Ser. No. 08/727,980, filed on Oct. 9, 1996 and entitled ACTIVE BLOWING SYSTEM FOR ROTORCRAFT VORTEX INTERACTION NOISE REDUCTION; and co-pending U.S. application Ser. No. 08/869,372, filed on Jun. 5, 1997 and entitled OSCILLATING AIR JETS ON AERODYNAMIC SURFACES; all of which are commonly assigned and the contents of which are expressly incorporated herein by reference.

BACKGROUND OF THE INVENTION

1. Field of the Invention

This invention relates generally to aerodynamic surfaces and, more particularly, to improved constructions and control schemes for such aerodynamic surfaces which provide for aerodynamic control and for significant reductions in noise in the case of rotor blades.

2. Description of Related Art

The prior art continues to encounter problems with providing controllable aerodynamic surfaces on rotor blades, wings, engine inlets, helicopter fuselages, and nozzles. Movable control surfaces placed on these aerodynamic surfaces have included flaps, slots, spoilers, ailerons, elevators, and rudders. Although these control surfaces can mechanically alter the geometry of the original aerodynamic device, they are limited in ability to respond quickly and efficiently. Prior art mechanical control surfaces can add mechanical complexity to the aircraft, can compromise structural integrity, can complicate manufacturing and can compromise radar detectability.

Conventional helicopters in descent flight conditions can also generate an impulsive noise signature which is commonly referred to as blade-vortex interaction (BVI) noise or "blade slap." BVI noise is generated by blade tip vortices, that interact with the rotor blades. Unfortunately, BVI noise is typically within a frequency range which is highly important to human subjective response. Additionally, it is easily detected electronically at large distances, thus increasing the vulnerability of military rotorcraft. Consequently, a reduction in the BVI noise intensity and changes in the noise signature, using active and/or passive noise control techniques, are desirable to the rotorcraft industry, which is challenged by today's stringent military and civilian acoustic regulations.

In addition to being detectible by BVI noise, an aircraft can also be detected by its infrared light signature. Accordingly, a means for efficiently and effectively reducing the infrared light signature of an aircraft is needed.

Three possible measures may be taken to reduce BVI noise. Namely, the tip vortex strength may be weakened, the separation distance between the blade and the tip vortex may be increased, and/or the blade geometry may be altered. The result of these measures is a decrease in the strength of the interaction between the rotor blade and the tip vortices. Existing devices which have been used for reducing BVI noise include the use of a blade mounted trailing edge flap which seeks to change the strength of the tip vortex and hence the intensity of BVI and the use of Higher Harmonic root pitch control (HHC), which seeks to change the blade vortex separation distance, and thus the local aerodynamic conditions, through blade pitch changes.

Other control means concentrate primarily on reducing the strength of the tip vortex through blade tip geometric modifications. Typical examples are the use of leading and trailing edge sweep, the use of blade anhedral, spoilers, and the use of a subwing concept. All of these examples, excluding HHC, may be classified as passive control techniques. An example of another active control technique would be the use of tip air mass injection, which again has the purpose of weakening the blade tip vortices. Tip air mass injection involves introducing a high energy air jet at the tip of the blade, aimed at the center of the tip vortex with the sole purpose of diffusing or weakening its strength.

Each of the prior art solutions to BVI noise has been at least partially unsuccessful, either because of ineffectiveness or because of the solution's detrimental side effects with respect to the flight characteristics and efficiency of the rotorcraft. For example, HHC methods change the aerodynamic conditions along the entire blade in order to reduce BVI noise, due to the change in blade pitch. Passive BVI noise control methods are not adaptable to other BVI and non-BVI conditions throughout the flight regime that are associated with changes in descent rate and forward flight speed. Additionally, most of the passive prior art solutions to the BVI problem are deployed at all times, whether or not needed, often degrading flight performance unnecessarily.

Another longstanding problem with conventional aircraft involves vibrations of the rotor hub and general inefficiencies of the rotor blade. Rotor blades which route jet engine exhaust to the tips thereof require a significant amount of jet exhaust, which can reduce an available amount of forward thrust of the resulting aircraft. Rotor blades of tiltrotor aircraft commonly introduce problems of download and fountain flow into the resulting system. Download and fountain flow conditions can be generally attributed to the downwardly directed air from the rotor blades in hover mode being directed onto the upper surfaces of the wings of the tiltrotor aircraft.

SUMMARY OF THE INVENTION

This invention addresses the aforementioned problems by providing an active control device that has a number of advantages over prior art approaches. A porous surface on an aircraft structure driven with oscillating positive and negative pressures is used as an active control device for attenuating negative aerodynamic interactions. The porous surfaces can be driven with positive and negative pressures either continuously or when predetermined flight conditions are present. The porous surfaces can be used on rotor blades to reduce BVI noise in descent flight conditions.

The porous surfaces of the present invention can be configured on rotor blades for affecting blade variable twist in accordance with various flight conditions, and can further be incorporated for reducing rotor hub vibrations as well. Porous surfaces placed on aerodynamic surfaces below the rotor blades of a tiltrotor aircraft can attenuate or eliminate download and fountain flow conditions. When placed on the trailing edges of a tip jet-exhaust driven rotor blade, the porous surfaces of the present invention can supplement the tip jet momentum of the exhaust to thereby reduce an amount of exhaust needed to drive the rotor blade. The porous surfaces can be used on other aircraft structures, such as wings, engine inlets, engine exhausts, blunt surfaces and nozzles.

The present invention, together with additional features and advantages thereof, may best be understood by reference to the following description taken in connection with the accompanying illustrative drawings.

BRIEF DESCRIPTION OF THE DRAWINGS

FIG. 1 is a cross-sectional view of an oscillating air jet assembly comprising a piezoelectric membrane in accordance with the present invention;

FIG. 2 is a schematic cross-sectional view of a rotor blade having a plurality of oscillating air jet assemblies near a leading edge thereof;

FIG. 3 is a schematic cross-sectional view of a rotor blade having a plurality of oscillating air jet assemblies near a trailing edge thereof;

FIG. 4 is a cross-sectional view of a rotor blade having an oscillating air jet assembly disposed therein in accordance with a first embodiment of the present invention;

FIG. 5 is a cross-sectional view of a rotor blade having an oscillating air jet assembly disposed therein in accordance with a second embodiment of the present invention;

FIG. 6 is a cross-sectional view of a rotor blade having an oscillating air jet assembly disposed therein in accordance with a third embodiment of the present invention;

FIG. 7 is a cross-sectional view of a rotor blade having an oscillating air jet assembly disposed therein in accordance with a fourth embodiment of the present invention;

DETAILED DESCRIPTION OF THE PRESENTLY PREFERRED EMBODIMENTS

Figure 8:
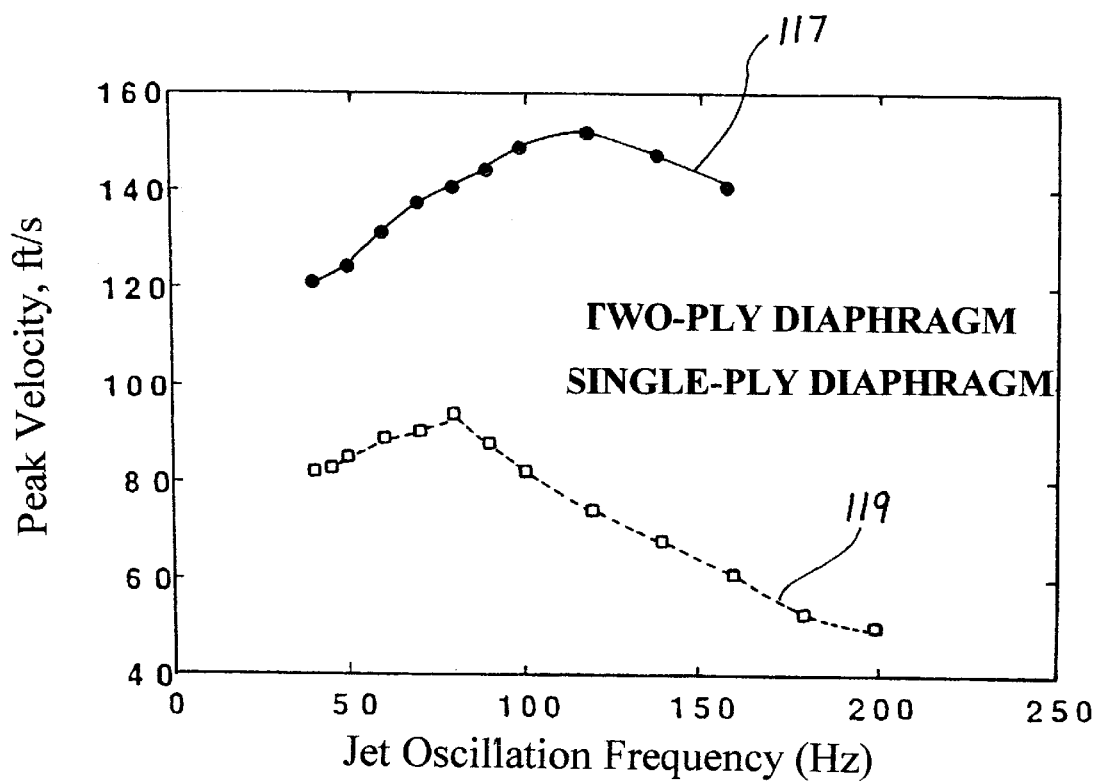
FIG. 8 illustrates the measured peak jet velocity as a function of jet oscillation frequency for two different stiffnesses of silicon rubber fiberglass "bellows" of an oscillating air jet assembly.

Referring now more particularly to the drawings, FIG. 1 illustrates an oscillating air jet assembly 21 which is disposed on an aerodynamic surface 23. The assembly 21 comprises a diaphragm 25 formed of a piezoelectric material. The diaphragm 25 is preferably supported between a first conductor 28 and a second conductor 30, and is movable in the directions of the arrows Al between a first position indicated by the reference numeral 25 and a second position indicated by the phantom lines 32.

A chassis 35 secures the first conductor 28 and the second conductor 30 to the diaphragm 24. An oscillating current is provided to the diaphragm 25 via the first conductor 28 and the second conductor 30, to thereby electrically stimulate the diaphragm 25 to oscillate in directions of the arrows Al.

Movement of the diaphragm from a first position to a position 32 shown in phantom produces a positive pressure within the sealed chamber 37, and movement of the diaphragm in the opposite direction produces a negative pressure in the sealed chamber 37. An aperture 41 is formed in the aerodynamic surface 23 to facilitate movement of air out of and into the sealed chamber 37, in response to the positive and negative pressures generated within the sealed chamber 37 by the diaphragm 25.

When the diaphragm 25 moves in a direction toward the aerodynamic surface 23 a positive pressure is produced within the sealed chamber 37, resulting in a flow of air out of the aperture 41. Similarly, when the diaphragm 25 moves away from the aerodynamic surface 23 a negative pressure within the sealed chamber 37 is established and, consequently, air is drawn into the sealed chamber 37 through the aperture 41.

The resulting oscillation of air into and out of the sealed chamber 37 through the aperture 41, as a result of the oscillating diaphragm 25, is referred to as a zero-mass jet or, alternatively, as an oscillating air jet assembly. The zero-mass jet of FIG. 1 preferably comprises a net mass of air flow into and out of the aperture 41 which is equal to zero during one complete cycle of oscillation of the diaphragm 25.

With reference to FIGS. 2 and 3, arrays of oscillating air jet assemblies 45 can be placed on a rotor blade 47 (cross-section shown) in a variety of different locations. The cross-sectional view of FIG. 2 illustrates a plurality of oscillating air jet assemblies 45 disposed on an upper surface of the rotor blade near a leading edge 49. An additional array of oscillating air jet assemblies 45 is disposed on a bottom surface of the rotor blade 47 near the leading edge 49.

FIG. 3 illustrates an array of oscillating air jet assemblies 45 disposed on an upper surface of the rotor blade 47 near a trailing edge 51 of the rotor blade 47, and further illustrates an array of oscillating air jet assemblies 45 on a bottom surface near the trailing edge 51 of the rotor blade 47. The oscillating air jet assemblies 45 of FIG. 2 may be disposed on only one of the two surfaces of the rotor blade 47 in alternative embodiments. Similarly, either or both of the arrays of oscillating air jet assemblies 45 may be disposed near the trailing edge 51 of the rotor blade 47 or at intermediate positions on the rotor blade (FIG. 17).

Placement of the oscillating air jet assemblies 45 on either the upper, the lower, or both surfaces of the rotor blade 47 results in substantial changes to the original aerodynamic characteristics of the rotor blade 47. Similar effects are achieved by placing the oscillating air jet assemblies 45 on other aerodynamic structures, such as wings, airplane/ helicopter fuselages, engine inlets, engine exhausts, blunt surfaces, and nozzles, for example. In the illustrated embodiment of FIG. 2, the oscillating air jet assemblies 45 are centered about the 15 percent rotor blade chord position. In the embodiment of FIG. 3, the oscillating air jet assemblies 45 are placed near the trailing edge 51 of the rotor blade 47 to emulate aerodynamic effects resulting from use of a mechanical integral-type flap.

The oscillating air jet assemblies 45 may comprise oscillating diaphragms, such as disclosed in FIG. 1 or, alternatively, may comprise other means, such as electromagnetic, for generating an oscillating air jet assembly, such as disclosed in FIGS. 4–7, for example. The oscillating air jet assemblies of the present invention are adapted for targeting local blade aerodynamics (blade geometry) rather than the vortex strength or the blade-vortex separation distance, for alleviation of helicopter rotor BVI. Other uses and effects, however, are also contemplated by the present invention in connection with the use of rotor blades and other aerodynamic surfaces.

FIG. 4 is a cross-section view illustrating an oscillating air jet assembly 61 installed within a rotor blade 63. The rotor blade 63 comprises a leading edge 65, a trailing edge 67, an upper surface 69, a lower surface 71, and an interior volume 73. The oscillating air jet assembly 61 generally comprises a piston 75, a diaphragm 77, an aerodynamic surface 79, a chassis 81, a magnet 85, and a voice coil 88. a plurality of apertures 90 are disposed in the aerodynamic surface 79. The oscillating air jet assembly 61 preferably comprises a single unit which can be secured into a recess in the upper surface 69 via mounting apertures 94. Screws or bolts may be inserted into the mounting apertures 94 and secured into a frame of the rotor blade 63, to thereby secure the oscillating air jet assembly 61 within the interior volume 73 of the rotor blade 63.

The piston 75 is secured by a preferably flexible diaphragm 77 to an underside of the aerodynamic surface 79 by means such as an adhesive, for example. The diaphragm 77 holds the piston 75 in close proximity to the plurality of apertures 90, and also holds the piston 75 in an orientation to place the voice coil 88 in close proximity to the magnet 85. The piston 75 preferably comprises a strong and lightweight material, such as an aluminum honeycomb or other composite material. The diaphragm 77 preferably comprises a flexible material having both a resilient characteristic and a memory characteristic. As presently embodied, the flexible diaphragm comprises silicone rubber with a fiberglass reinforcement material added thereto. The diaphragm 77 preferably creates a sealed chamber between the piston 75 and the plurality of apertures 90 on the aerodynamic surface 79.

The voice coil 88 preferably comprises a cylindrical structure which is attached to a bottom surface of the piston 75. The piston 75 is also cylindrically or rectangularly shaped. A single wire is wound around a cylindrical wall, or a rectangular box-like wall, to thereby form the voice coil 88. The wire is routed from the voice coil 88 to a conductor path 98. As presently embodied, the magnet 85 comprises a rare-earth material for providing a fixed magnetic field. Other means for providing a fixed magnetic field, however, may be used as is known in the art. For example, a single-wire winding may be used. The magnet 85 is preferably ring-shaped, to thereby accommodate the voice coil 88 therein. In modified embodiments, the magnet 85 comprises one or more rods having a rectangular cross-section(s).

An oscillating electric current is fed from the conductor path 98 to the voice coil 88 to thereby generate an oscillating magnetic field, which when coupled with the fixed magnetic field from the magnet 85, produces electrodynamic forces for moving the piston 75. Movement of the piston 75 in a direction toward the plurality of apertures 90 forces air out through the aerodynamic surface 79. Similarly, movement of the piston 75 in a direction away from the apertures 90 draws air through the plurality of apertures 90 and into the aerodynamic surface 79.

As an alternative embodiment to the circular piston 75, voice coil 88, and magnet 85, other elliptical shapes may be implemented. According to one alterative embodiment, an oval shape or a rectangular shape may be used for the piston 75, the magnet 85, and the voice coil 88. The oval shapes of the elements 75, 85, 88 can extend along a length of the rotor blade 63 to provide a perhaps more advantageous configuration. An oval shape is contemplated to provide specific stability features which may be suitable for various specific acceleration forces which are experienced at different points along a rotating rotor blade.

The voice coil 88 may be energized via the conductor path 98 continuously or according to predefined parameters. A controller 100 can issue signals to the conductor path 98 via a juncture 102, for example. As discussed below with reference to FIGS. 9–16, the controller 100 can receive and process information from an upper pressure sensor 105, a lower pressure sensor 110, a microprocessor (not shown), or by other means such as a user input via the other conductive path 112.

Electrical signals can also be supplied to the conductive path 98 via another conductive path 112 which may be responsive to user inputs, for example. Power is supplied to the oscillating air jet assembly 61 via the other conductive path 112 or, alternatively, a local power source such as a battery (not shown) may be implemented. a conductive path 116 connects the controller 100 to the upper pressure sensor 105 and the lower pressure sensor 110, as presently embodied. In alternative embodiments where the piston 75 is driven continuously or where the piston 75 is driven from a source other than the controller 100, the controller 100 may be eliminated. Alternatively, the controller 100 may be positioned in other locations, such as a location outside of the rotor blade 63.

The single-wire winding disposed around the cylindrical wall, which is attached to the piston 75, is referred to herein as a voice coil 88 for illustrative purposes only. Voice coils of loud speakers, for example, comprise differently proportioned elements which are adapted to perform different functions than the elements of the oscillating air jet assembly 61. The voice coil 88 and piston 75 are configured, for example, to produce pressures which are on an order of magnitude greater than pressures produced by prior art loud speakers. Loud speakers, for example, do not typically comprise pistons 75 formed of lightweight, rigid materials. The plot illustrated in FIG. 8 shows peak velocity versus jet oscillation frequency, for diaphragms 25 of different stiffnesses. The plot 117 corresponding to a two-ply diaphragm 25 provides a larger peak velocity through the aperture 41, compared to the plot 119 corresponding to a single-ply diaphragm 25.

Additionally, a ratio of the voice coil 88 diameter to the piston 75 diameter is relatively small, compared to ratios of typical voice coil speaker systems. This ratio of the voice coil 88 diameter to the piston 75 diameter is preferably less than or equal to about one half and, in the illustrated embodiment, is equal to about 0.67.

The piston 75 is adapted to oscillate at relatively low frequencies, compared to piezoelectric diaphragms, such as the diaphragm 25 illustrated in FIG. 1. The relatively small volume of air between the piston 75 and the plurality of apertures 90 provides the oscillating air jet assembly 61 with a relatively large compression ratio, which is sufficient to generate relatively high velocities of air through the plurality of apertures 90. The spring rate and moving mass of the piston 75 and diaphragm 77 may be tuned to allow for an operation which is always at the system's natural frequency to further enhance efficiency. When utilized in a helicopter blade, for example, the mass of the oscillating air jet assembly 61 may be located at a forward location of the normal center of mass of the rotor blade 63. Consequently, the oscillating air jet assembly 61 may be substituted for the tip and/or leading edge weight which is typically present in a rotor blade.

FIGS. 5–7 disclose other oscillating air jet assembly embodiments. The discussion of FIG. 4 applies in large part to the discussion below with reference to FIGS. 5–7 and FIG. 18. The oscillating air jet assemblies of FIGS. 4–7 and can be implemented in virtually any rotor blade and on other aerodynamic structures, such as wings, engine inlets, engine exhausts, blunt surfaces, and nozzles, for example. The oscillating air jet assemblies of FIGS. 4–7 can additionally be constructed for use in fixed wing applications including engine inlets (for stall alleviation) and exhaust (for vectoring). The oscillating air jet assemblies of the present invention can further be used in non-aircraft applications and with other fluids in addition to air, in addition to the above-described applications of the invention. Similarly to the embodiment of FIG. 4, the oscillating air jet assemblies of FIGS. 5–7 are configured to output relatively high energy levels, compared to the embodiment of FIG. 1. All of the oscillating air jet assemblies of the present invention provide benefits including reduced mechanical complexity, reduced compromise of structural integrity, relatively simple manufacturing, reduced configuration aerodynamic drag, reduced air-source power requirements, greater flexibility in placement and less impact on structure, and reduced radar detectability relative to the edges, gaps, and angles formed by conventional aerodynamic control surfaces or Coanda slots, for example.

In the embodiment of FIG. 5, like elements are designated with like reference numerals followed by the letter "a" The oscillating air jet assembly 120 comprises a voice coil 88a connected between a diaphragm 77a and a cone 124. The cone 124 may comprise a nickel electroform material, for example, and the diaphragm 77a is preferably constructed of a material suitable for holding and aligning the cone 124 within the magnet 85a.

In FIGS. 4–7, only a single oscillating air jet assembly is illustrated. Should a second oscillating air jet assembly be required for placement on the lower surface of the rotor blade, a second oscillating air jet assembly may be placed aft of the first oscillating air jet assembly. In FIG. 5, the first oscillating air jet assembly 120 extends between the 12.5 percent and the 22.5 percent blade chord positions. A second oscillating air jet assembly may be placed between the 22.5 percent and the 32.5 percent blade chord positions. Also, in the embodiments of FIGS. 4–7, the pressure sensors 105, 110 are disposed at the 5 percent blade chord position.

FIG. 6 illustrates an oscillating air jet assembly 130 in accordance with the present invention. A piston 132, which preferably comprises an aluminum honeycomb material, is held in place by a first diaphragm 135 and a second diaphragm 137. Both the first diaphragm 135 and the second diaphragm 137 preferably comprise a silicone rubber having a fiberglass reinforcement. A connecting member 139, which preferably comprises aluminum, connects the piston 132 to the second diaphragm 137.

The combination of the first diaphragm 135 and the second diaphragm 137 provides sufficient strength, flexibility, and memory to properly align the voice coil 142 within the gaps of the magnet 145 during the dynamic operation of the rotor blade 63b. The fabrication of the connecting member 139 of aluminum provides for heat dissipation, to thereby dissipate heat generated by the voice coil 142, for example.

A sealed volume of air between the piston 132 and the plurality of apertures 90b is relatively small in the embodiment of FIG. 6, facilitating the generation of high jet pressures by the piston 132. In the embodiment of FIG. 6, for example, a first chord 150 and a second chord 152 are coupled to the magnet 145, to channel the electric current to the voice coil 142. The first chord 150 and the second chord 152 form a gap, which accommodates the voice coil 142 therein. The first chord 150 and the second chord 152 help to align the voice coil 142, and further help to stabilize the voice coil 142 and prevent the voice coil 142 from contacting and rubbing against the chords 150, 152.

FIG. 7 illustrates another embodiment of the present invention. In the embodiment of FIG. 7, like elements are denoted with like numerals, followed by the letter "c." The oscillating air jet assembly 155 of FIG. 7 generally comprises a piston 75c and a diaphragm 77c, both of which are similar to the piston 75 and the diaphragm 77 of FIG. 4. The oscillating air jet assembly 155 of FIG. 7 further comprises a voice coil 142c, a magnet 145c, a first chord 150c, and a second chord 152c, which are similar to the elements 142, 145, 150, and 152, respectively, of FIG. 6. As with the other illustrated embodiments, the chassis 81c is aluminum or super plastic formed and the aerodynamic surface 79c comprises nickel hydroform.

FIGS. 9–16 illustrate results obtained from computational fluid dynamics simulations of air flow over an exemplary rotor blade airfoil having oscillating air jet assemblies disposed on upper and lower surfaces thereof between the 0.13 and 0.23 airfoil chord positions. The simulated rotor blade section comprises a symmetric NACA-0012 airfoil. The simulations were performed using a free-stream Mach number (Minf) of 0.6 and an angle of attack (Alfa) of 0 degrees. In the simulations of FIG. 9–14, a peak jet velocity (vn) of 0.20 was used. A peak jet velocity (vn) of 0.05 was used for the simulations of FIGS. 10 and 13. Also, peak jet velocities of 0.05, 0.10, and 0.20 were used in the simulations of FIGS. 10 and 13.

Figure 9:
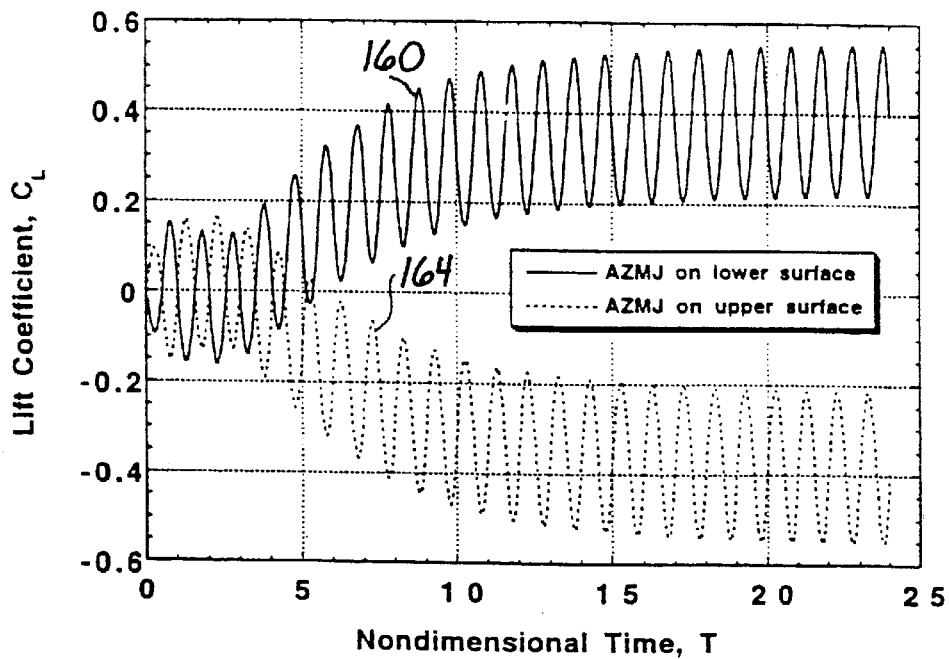
FIGS. 9–16 illustrate results obtained from computational fluid dynamics simulations of air flow past rotor blades incorporating various oscillating air jet assemblies in accordance with the present invention.

FIG. 9 illustrates a plot of lift coefficient versus nondimensional time for an oscillating air jet assembly. An array of zero mass jets (AZMJ) is disposed on an upper surface of the simulated airfoil and on a lower surface of the simulated airfoil. The line 160 represents the results of a simulation for an AZMJ placed on a lower surface of an airfoil, and the line 164 represents a plot of the results of a simulation of an AZMJ placed on an upper surface of an airfoil. The jet oscillation frequency (f) was equal to 1585 Hz in both simulations. FIG. 9 indicates that the activation of the lower surface AZMJ results in a net increase in the mean sectional lift. This result is similar to a simulation obtained from a trailing-edge flap down condition of an airfoil. Activation of the upper surface AZMJ results in a decrease in the sectional lift, which corresponds to a deployed trailing-edge flap up condition. The results of the simulations of FIG. 9 suggest that, when operated independently, the AZMJ systems can emulate substantially the same aerodynamic effects, in a mean sense, which are produced using a mechanical trailing-edge flap. The unsteady aerodynamic effects which result from a harmonically moving trailing-edge flap can thus be emulated, again in a mean sense, by repetitively activating and deactivating the upper and lower surface AZMJ systems.

Figure 10:
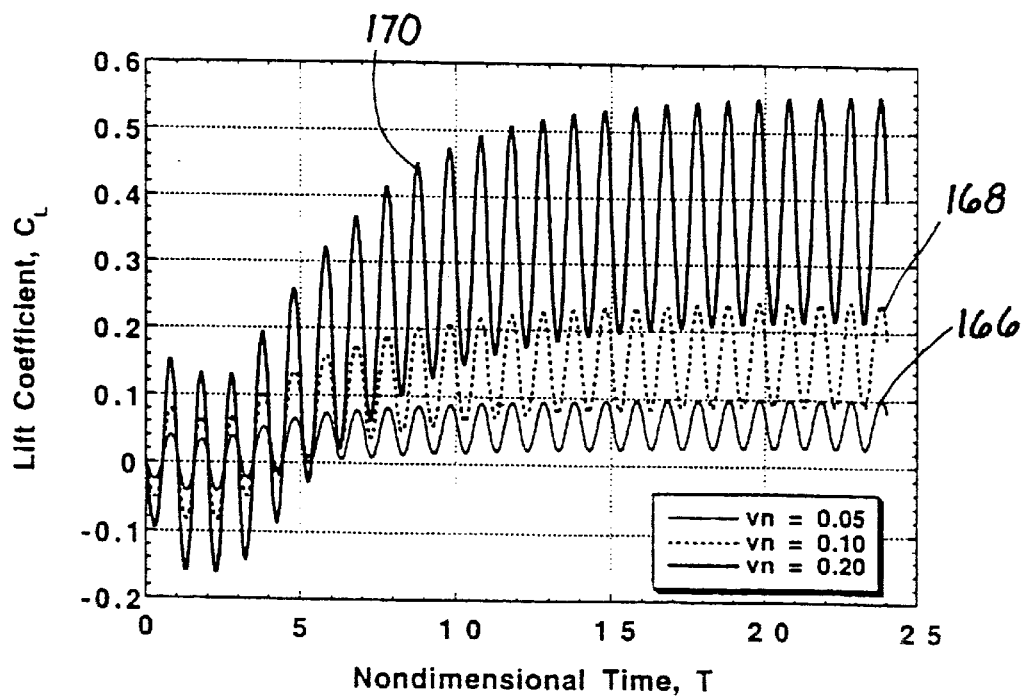

FIG. 10 illustrates several simulations of an active lower surface AZMJ using various peak jet velocities (vn). The term peak jet velocity refers to a peak velocity of air detected outside the aperture 41 of the jet assembly divided by the free stream speed of sound. The first plot 166 corresponds to a simulation using a peak jet velocity of 0.05, and the second plot 168 corresponds to a simulation using a peak jet velocity of 0.10. The third plot 170 corresponds to a simulation using a peak jet velocity of 0.20. A jet oscillation frequency of 1585 Hz was used for each of the plots 166, 168, and 170. FIG. 10 indicates a direct relationship between jet peak velocity and the attainable mean lift value. The higher jet peak velocity of 0.20 generates a higher lift coefficient, as indicated by the plot 170.

Figure 11:
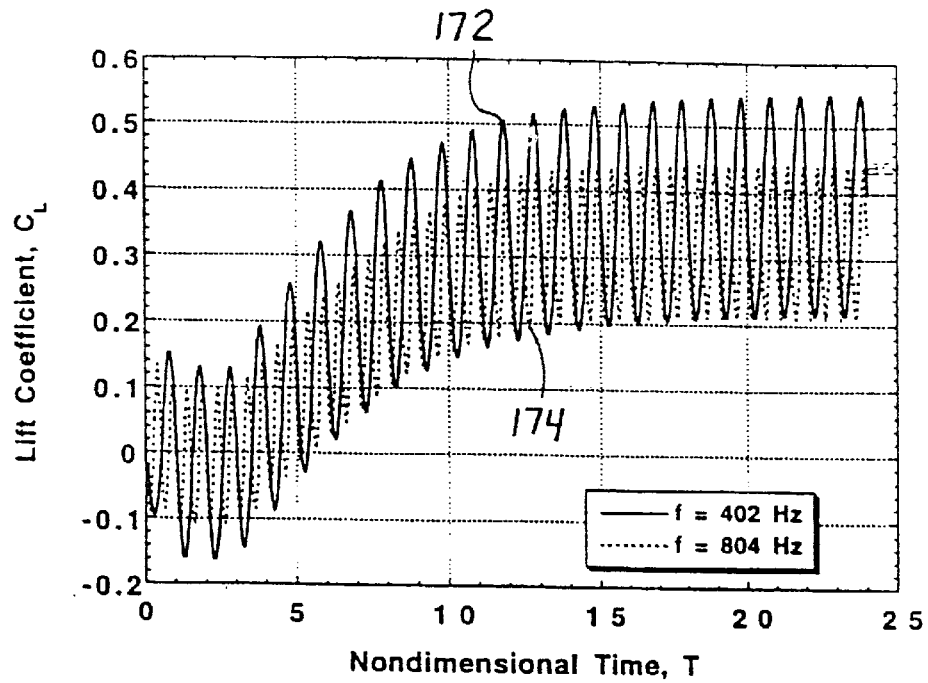

FIG. 11 illustrates a plot of lift coefficient versus nondimensional time for simulations using two different oscillation frequencies. The plot 172 corresponds to a simulation using a jet oscillation frequency of 1585 Hz, and the plot 174 corresponds to a simulation using A jet oscillation frequency of 3170 Hz. The results of FIG. 11 indicate that higher oscillation frequencies are associated with lower mean sectional lift values. These results also suggest that the jet oscillation frequency can be used as an alternative parameter to the jet peak velocity for controlling the attainable mean sectional lift values.

Figure 12:
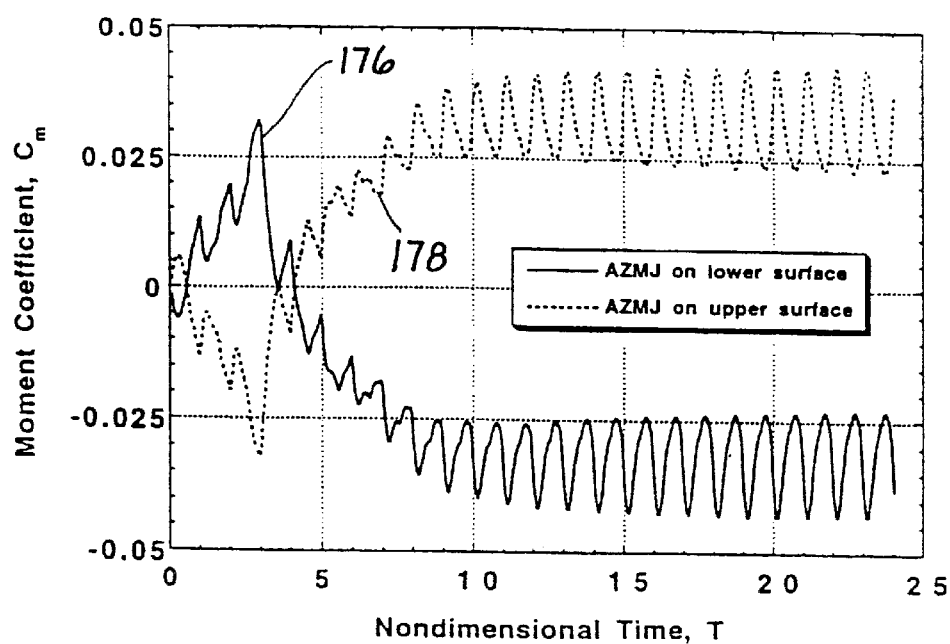

FIG. 12 illustrates a plot of airfoil quarter chord moment coefficient versus nondimensional time for simulations incorporating an AZMJ on a lower surface and an AZMJ on an upper surface of an airfoil. The plot 176 corresponds to a simulation of an AZMJ system on a lower surface of an airfoil, and the plot 178 corresponds to a simulation of an AZMJ device on an upper surface of an airfoil. A jet oscillation frequency of 1585 Hz was used for both simulations. FIG. 12 indicates that the activation of the lower surface AZMJ system results in a negative pitching moment (nose down), which effect is similar to that obtained by deploying a trailing-edge flap down. The activation of the upper surface AZMJ results in a positive pitching moment (nose up), which effect is similar to that obtained by deploying a trailing-edge flap up. The results of FIGS. 9 and 12 suggest that, when operated independently, the AZMJ systems can emulate similar aerodynamic effects, in a mean sense, to those produced using a mechanical trailing-edge flap.

Figure 13:
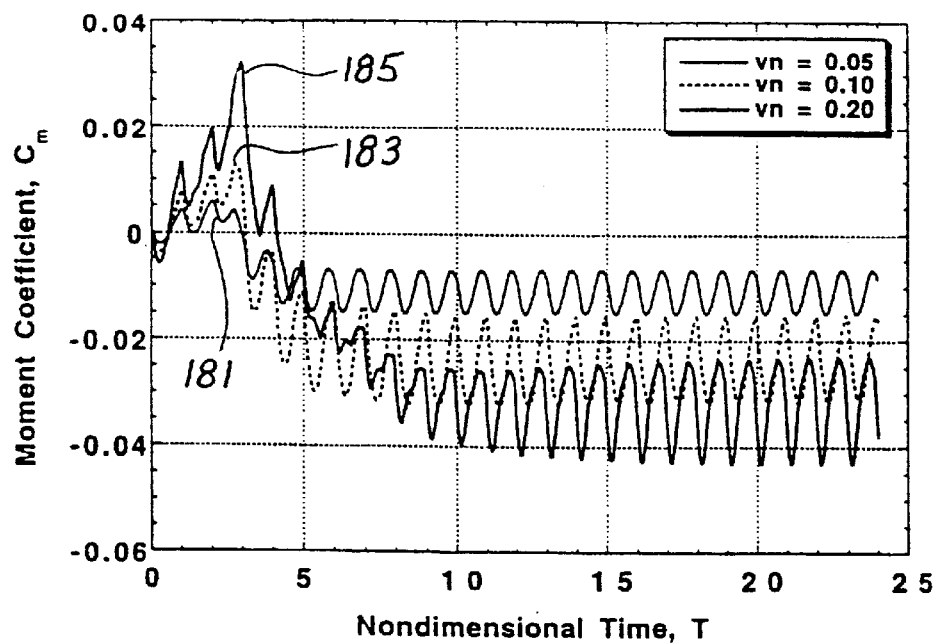
Figure 14:
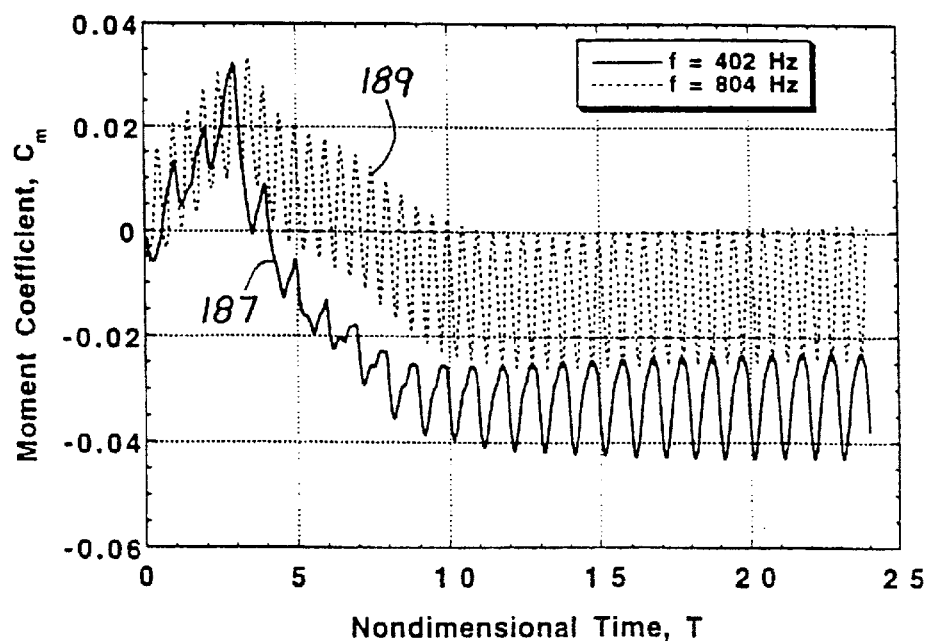

FIGS. 13 and 14 are plots of nondimensional time versus pitching (or quarter chord) moment coefficient for various simulations. The simulations of FIG. 13 vary the peak jet velocities, and the simulations of FIG. 14 vary the jet oscillation frequencies. The simulations of both FIG. 13 and FIG. 14 were conducted for active lower surface AZMJ systems. The plot 181 in FIG. 13 corresponds to a simulation using a peak jet velocity of 0.05, and the plot 183 corresponds to a simulation using a peak jet velocity of 0.10. The plot 185 corresponds to a simulation using a peak jet velocity of 0.20. FIG. 13 indicates a direct relationship between the peak jet velocity and levels of the attainable mean pitching moment values. As the jet peak velocity is increased, the levels of the attainable pitching moment values are likewise increased.

FIG. 14 illustrates a first plot 187 of pitching moment coefficient versus nondimensional time, corresponding to a jet oscillation frequency of 1585 Hz. The plot 189 corresponds to a simulation using A jet oscillation frequency of 3170 Hz. The plots of FIG. 14 indicate that the jet oscillation frequency can also be used, in addition to the peak jet velocity, as a means for altering the attainable mean pitching moment values.

The controller 100 of FIGS. 4–7 can be used to instruct the piston 5, or the cone 124 to oscillate with various intensities and frequencies. Additionally, the controller 100 can instruct a lower piston (not shown) to oscillate with various intensities and frequencies, according to the present invention. Instructions to vary the parameters of operation of upper and lower pistons can be generated by a microprocessor (not shown), by the sensors 105, 110, or by other means such as a user input via the other conductive path 112. The instructions may alternatively originate within the controller 100.

A piston on a lower surface of an airfoil can be oscillated to increase an amount of lift generated by the rotor blade, in response to an instruction to the controller to either increase the lift or to generate a negative pitching moment (nose down) on the rotor blade. A piston disposed on the upper surface of an airfoil can be oscillated to decrease an effective amount of lift generated by the rotor blade, in response to an instruction to decrease an amount of lift or to generate a positive pitching moment (nose up). Additionally, a piston on the upper surface of an airfoil may be oscillated at a higher frequency to effectively decrease an amount of lift of the rotor blade, and may be oscillated at a lower frequency to effectively increase an amount of lift generated by the rotor blade. A similar situation applies for a piston disposed on a lower surface of an airfoil, where greater frequencies reduce lift and smaller frequencies increase lift. Instructions may be input into the controller 100 to change the lift generated by the rotor blade and/or the pitching moment generated by the rotor blade, by varying the frequency of one or more pistons.

Additionally, a piston on an upper surface of an airfoil may be oscillated at a greater energization level to effectively decrease the lift of the rotor blade, and may be oscillated at an effectively lower energization level to effectively increase the lift of the rotor blade. A piston disposed on a lower surface of an airfoil may be oscillated at a greater energization level to generate greater lift, and may be oscillated at a lower energization level to decrease lift. Instructions may be input into the controller 100 to affect different amounts of lift and/or pitching moments by changing the energization level of the piston or cone.

Figure 15:
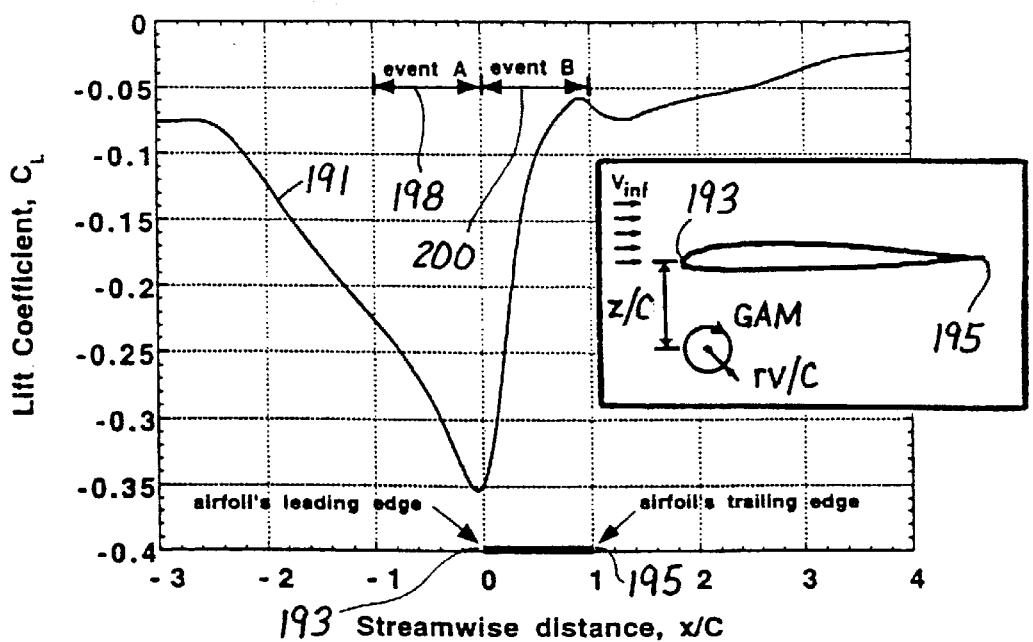

FIG. 15 is a plot of lift coefficient versus stream-wise distance. The plot 191 illustrates a simulated temporal variation of the sectional lift for the NACA-0012 airfoil during parallel interaction with a vortex of strength (GAM), equal to 0.30, having a core radius (rv) equal to 0.20C (where C is the chord length of the airfoil), and located at a miss distance (Zv) equal to minus 0.25C. The airfoil experiences a continuous decrease in its sectional lift values as the vortex approaches the leading edge of the airfoil, as indicated in FIG. 15. Once the vortex passes beyond the leading edge of the airfoil, there is a rapid increase in the airfoil's sectional lift values. The rapid increase continues and eventually levels off as the vortex moves further downstream of the airfoil's trailing edge. In the absence of the simulated vortex of FIG. 15, the airfoil's sectional lift value would be equal to zero by virtue of the airfoil's geometric symmetry and zero angle of attack.

The oscillating air jet assemblies of the present invention can be synchronized together by the controller 100 (FIGS.

4–7, for example) to attenuate the aerodynamics which contribute to BVI. The temporal lift distribution of FIG. 15 is partitioned into Event A indicated by the reference numeral 198 and an Event B indicated by the reference numeral 200. Event A is associated with the observed decrease in the sectional lift which takes place as the vortex approaches the airfoil's leading edge 193, and Event B is associated with the observed rapid increases in the sectional lift as the vortex passes and continues to move downstream beyond the airfoil's leading edge 193. An oscillating air jet assembly is provided on the lower surface of the airfoil in order to reduce the rate at which the sectional lift is decreasing. The oscillating air jet assembly on the lower surface of the airfoil operates to increase the airfoil's sectional lift values, while the lift is decreasing on the airfoil. The controller 100 controls the oscillating air jet assembly on the lower surface of the airfoil only until the vortex reaches the airfoil's leading edge 193. Thus, the oscillating air jet assembly on the lower surface is active only before and during Event A.

The upper pressure sensor 105 and the lower pressure sensor 110 on the airfoil of FIG. 4 operate to detect a change in the sign of the temporal variation of the differential pressure, which is proportional to the airfoil's sectional lift. Thus, the differential pressure is obtained at a first point in time by subtracting the pressure from the upper pressure sensor 105 from the pressure of the lower pressure sensor 110. This differential pressure will remain negative during Event A, while the vortex is upstream of the airfoil's leading edge 193, and the temporal gradients will also remain negative. Once the vortex moves beyond the airfoil's leading edge 193, the differential pressure becomes positive and their temporal gradients also become positive. The gradient is determined by comparing a current sensed differential pressure with a previously sensed or user-input differential pressure. A memory location can be used to store the previously sensed differential pressure, or the user-inputs, with the current sensed differential pressure.

At the transition between Event A and Event B, the lower surface oscillating air jet assembly is deactivated by the controller 100, and the upper surface oscillating air jet assembly is activated by the controller 100. By activating the upper surface oscillating air jet assembly, the controller 100 attempts to reduce or neutralize the rate at which the airfoil's lift is increasing by virtue of the interaction of the airfoil with the vortex. Since negative lift values are achieved by activating an upper surface oscillating air jet assembly, the rapid increase in lift is indeed attenuated.

Figure 16:
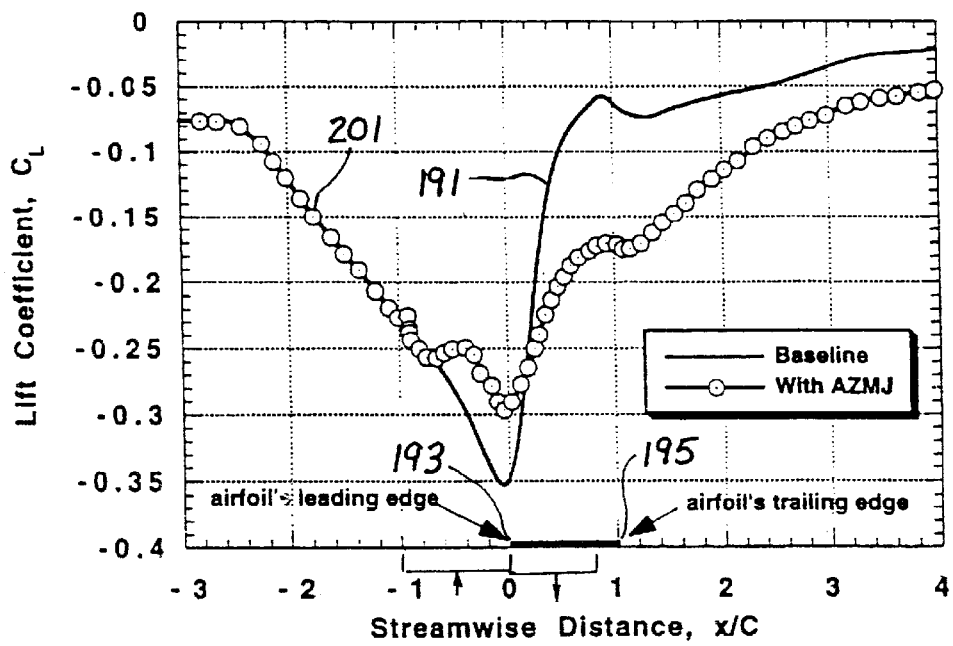

FIG. 16 illustrates a plot of lift coefficient versus streamwise distance for the situation of FIG. 15. In this plot, the peak jet velocity is equal to 0.20 and the jet oscillation frequency is equal to 1585 Hz. In this simulation, represented by the plot 201 in FIG. 16, the lower surface oscillating air jet assembly was activated when the vortex was approximately at a distance of one chord length ahead of the airfoil. The upper surface oscillating air jet assembly was deactivated when the vortex reached the airfoil's 0.75C chord position. The plot 191 of FIG. 15, depicting the original uncompensated airfoil response to the vortex passage, is also shown in FIG. 16. An approximately 55 percent reduction in the peak-to-peak lift values is achieved with the control technique of the present invention, according to the simulation. The reduction and the associated decrease in the temporal rates of variation of the airfoil's sectional lift translate into lower BVI noise levels.

Since BVI is typically felt by at least the outboard 40–50% of the rotor blade, the present invention contemplates multiple oscillating air jet assemblies along the length of the rotor blade. In addition to oscillating air jet assemblies incorporating cones or pistons, other oscillating air jet assemblies, such as the diaphragm disclosed in FIG. 1, for example, are contemplated by the present invention. In an embodiment having multiple oscillating air jet assemblies along the outboard 40–50% of the rotor blade, operation of the device is generally dependent on the sensitivity of the leading edge pressure sensors and detecting changes in the signs of the temporal gradients of the differential pressures. Also, since multiple interactions are usually present in helicopter rotor BVI, the frequency of the activation/deactivation of the lower and upper oscillating air jet assemblies will be proportional to the number of interactions being detected, for a given rotor blade radial station. The peak jet velocities and/or the jet oscillation frequencies may be tailored to the particular radial station, using higher peak jet velocities for the stronger interactions occurring near the tip of the rotor blade and lower peak velocities for the weaker interactions which occur at the more inboard radial stations of the rotor blade.

Since the oscillating air jet assemblies of the present invention do not require external equipment for adding and subtracting air mass, complex control systems for administering air to the rotor blades are not required. The power requirements for the oscillating air jet assemblies of the present invention are relatively small. For example, the piezoelectric cells comprising the diaphragm of FIG. 1 are typically driven with power requirements on the order of a few miliwatts.

The oscillating air jet assemblies of the present invention are able to change the local aerodynamics of the airfoil (blade) independent of the vortex strength, the blade/vortex separation distances, and the number of the blade/vortex encounters. Peak jet velocity and oscillation frequency are adaptable to changing BVI conditions which are associated with changes in the decent rate and forward flight speed. The adaptability of peak jet velocities and oscillation frequencies to changing BVI conditions, according to the present invention, presents an advantage over passive BVI noise control systems. Applications of the oscillating air jet assemblies of the present invention can be useful in low speed descent flight conditions, which typically give rise to BVI noise.

Figure 17A:
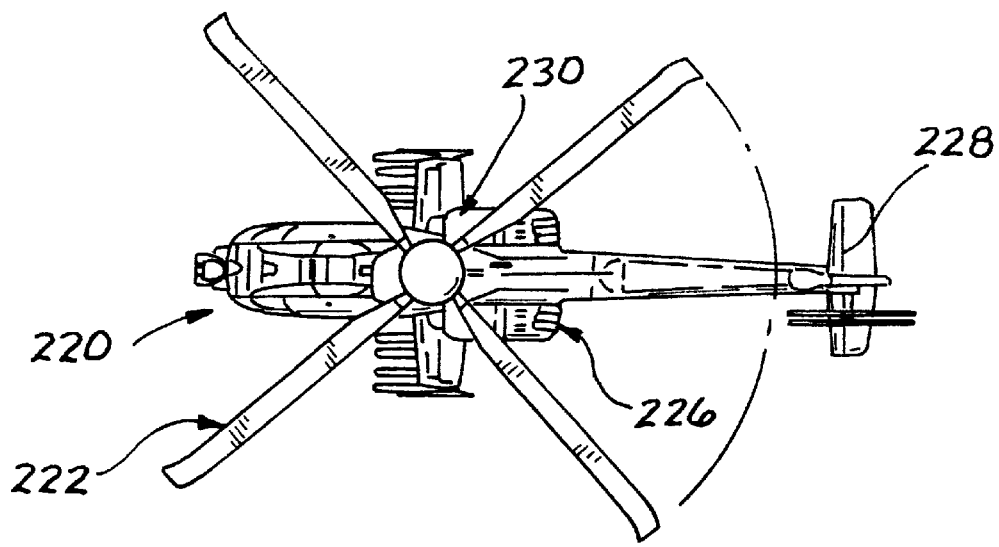
FIGS. 17a and 17b illustrate top and side elevational views of a conventional helicopter having oscillating air jet assemblies disposed thereon.
Figure 17B:
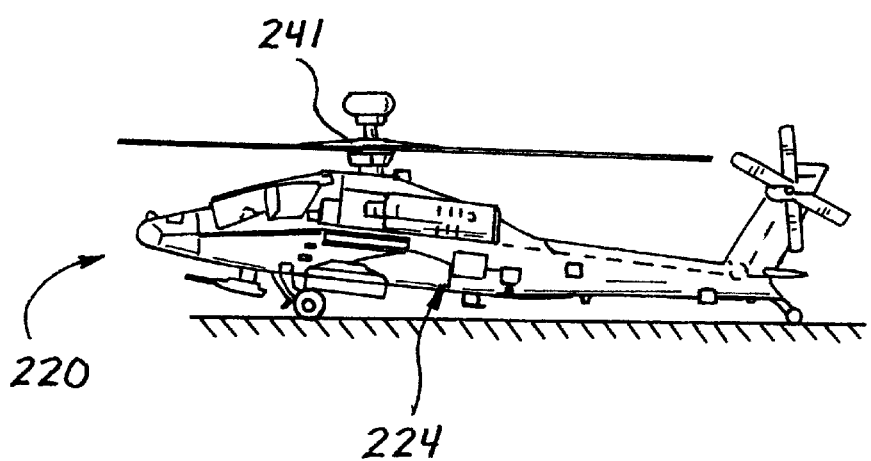

FIGS. 17a and 17b illustrate top and side-elevational views of a conventional helicopter 220. Oscillating air jets or oscillating air jet assemblies can be placed on various surfaces of the helicopter 220 in order improve the local aerodynamics and, collectively, improve the overall configuration aerodynamics. Oscillating air jet assemblies may be placed on the rotor blade 222 in order to alleviate impulsive loads associated with BVI which occur in low speed descent flight. Oscillating air jets or oscillating air jet assemblies can be placed on any blunt aerodynamic surfaces which contributes to the formation of a separated flow region and the attendant pressure drag. The exemplary blunt surface 224 of FIG. 17b comprises a base of the extended forward avionics bays (EFABS) which house the aircraft's electronic components for the avionics systems. Since low energy recirculation flow is expected downstream from the blunt surface 224, energization of the flow via the use of oscillating air jet assemblies distributed over the base of the EFABS helps to aerodynamically tailor the surface. In the illustrated example, the axes of the oscillating air jet assemblies are lined with the direction of free stream flow, and preferably are not perpendicular to the direction of free stream flow. By energizing the air flow downstream of the blunt surface, the associated pressure drag is attenuated, without any structural modifications to the original geometry of the blunt surface 224.

Oscillating air jet assemblies are disposed in close proximity to the engine exhausts 226 in order to vector the engine exhaust and reduce the drag associated with the component of momentum from the engine exhaust normal to that of the free stream flow. As presently embodied, the engine exhaust is vectored to a more suitable angle in order to maximize a reduction of drag therefrom. The exhaust flow angle can be adjusted in order to minimize impact from the exhaust with tail surfaces 228 of the helicopter 220. Vectoring of the engine exhaust away from the tail surfaces 228 increases the aerodynamic effectiveness of the tail surfaces 228 and, consequently, increases the overall handling qualities of the helicopter 220. Oscillating air jet assemblies of the present invention disposed in close proximity to the exhausts 226 can be utilized to efficiently mix the exhaust with the ambient air for a reduced infrared signature of the helicopter 220. Reducing the infrared signature of the otherwise high-temperature exhaust flow can reduce the detectability of a military aircraft and enhance aircraft survivability.

When placed on control surfaces of the tail surfaces 228, the oscillating air jet assemblies can effectively emulate hinged control surfaces thereon. The oscillating air jet assemblies of the present invention can facilitate the construction of control surfaces without hinge lines. The oscillating air jet assemblies forming the control surfaces can be constructed on the tail surfaces 228 or the rotor blades 222 of the helicopter 220. The complexity associated with the installation and operation of flap actuators and associated linkages is thus eliminated, without loss of control surface effectiveness or functionality.

The flow of air into engine inlets 230 of the helicopter 220 can be made more uniform with the positioning of oscillating air jet assemblies on the inlet cowling. In order to maximize uniformity, the flow angle in each inlet section is locally adjusted to improve the efficiency of the engine by minimizing losses associated with flow non-uniformity. In order to maintain uniform flow, the peak jet velocities and/or oscillation frequencies can be locally adjusted to achieve an optimal degree of uniformity in each inlet section. One or more controllers and flow detectors may be implemented for providing the local adjustments to the oscillating air jet assemblies.

Oscillating air jet assemblies are disposed on the upper and lower surfaces of the rotor blade 222 near the root. The aerodynamics associated with blade root pitch can be emulated, in a mean sense, via the use of the pair of arrays of oscillating air jet assemblies on the upper and lower surfaces of the rotor blade 222. As discussed above with reference to FIG. 9, for example, by alternating between oscillating air jet assemblies on the upper surface of the rotor blade and oscillating air jet assemblies on the lower surface of the rotor blade, an alternating mean torsional moment which emulates that resulting from blade root pitch can be obtained, without the need for complex hub-based mechanical control systems. An alternative configuration comprises multiple arrays of oscillating air jet assemblies, rather than only two, distributed along the length of the rotor blade surface to achieve the necessary aerodynamic effect. The specific implementation of either embodiment is a function of whether one or more arrays of oscillating air jet assemblies are needed for achieving the necessary pitching, or torsional moments.

Figure 18A:
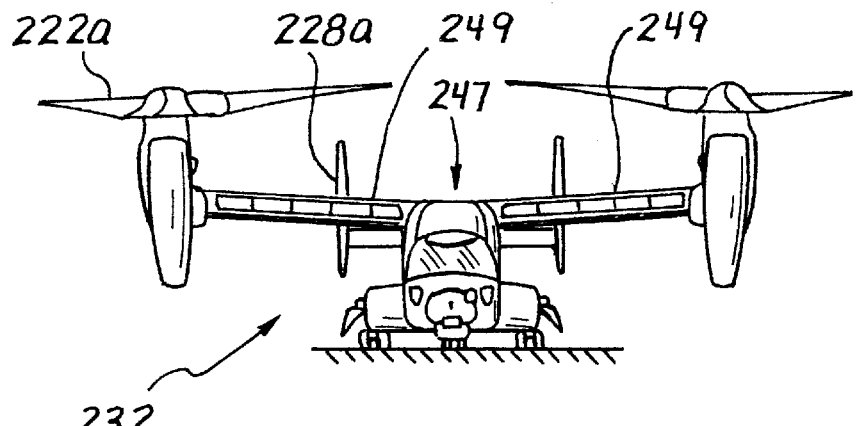
FIGS. 18a and 18b illustrate top and side elevational views of a tiltrotor aircraft having oscillating air jet assemblies disposed thereon.
Figure 18B:
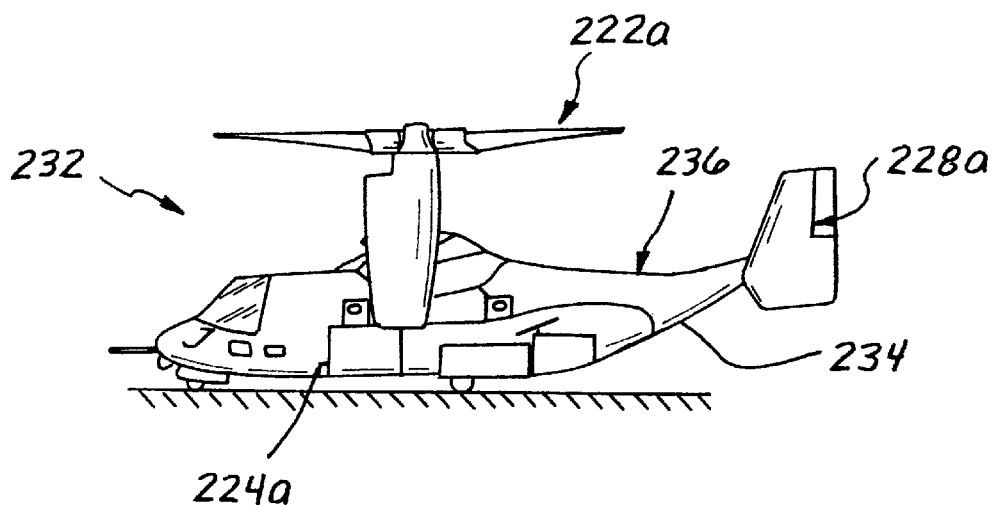

FIGS. 18*a* and 18*b* illustrate front and side elevational views of a tiltrotor aircraft having oscillating air jet assemblies disposed thereon. In FIGS. 18*a* and 18*b*, like elements are designated with like reference numerals followed by the letter "a." The tilt rotor aircraft 232 comprises oscillating air jet assemblies disposed on the rotor blades 222*a*, control surfaces 228*a*, and blunt surfaces 224*a*. Additionally, oscillating air jet assemblies are disposed on a portion 234 of the fuselage 236 for reducing upsweep drag. Unlike a conventional helicopter, the tiltrotor aircraft operates in three distinct modes of flight. In hover, the proprotors operate in a flow environment very similar to that of a conventional rotor on a typical commercial or military helicopter. In transitional flight, where the engine nacelles are at an angle between 0 and 90 degrees, the proprotors function identically to a conventional helicopter rotor in forward or "edgewise". flight. In cruise mode, where the engine nacelles are at a 0 degree angle, the proprotors function as fixed-wing aircraft propellers to provide forward thrust. In order to meet the maximum efficiency requirements for each of the three different modes of flight, the blade radial twist distribution should be different for each mode of flight. Accordingly, in the prior art the blade radial twist distribution must be selected to optimize a single mode of flight. The blade radial twist distribution is conventionally configured to favor hover efficiency. In this configuration, the cruise efficiency is only partially met due to the conflicting blade radial twist requirements of the hover mode. Accordingly, the blade radial twist distribution in this example compromises both the optimum hover and cruise efficiencies. For transitional flight, the optimum blade radial twist distribution is typically not as important due to the short duration of this flight mode. For a typical proprotor blade, the total radial twist is approximately equal to 39 to 45 degrees from root to tip.

By incorporating two or more arrays of oscillating air jet assemblies along the length of each rotor blade, for example, near the root and tip of each rotor blade, optimum aerodynamic performance can be achieved regardless of the particular flight mode. It is well known in the art that hover favors high positive twist values near the root section of the rotor blade and lower negative twist values near the rotor blade tip. This radial twist distribution can be achieved through torsional moments acting in opposite directions at the root and tip sections of a "torsionally soft" rotor blade. For example, by placing an array of oscillating air jet assemblies on the upper surface of the blade near the root, a positive or nose up moment can be achieved. Similarly, by placing an array of oscillating air jet assemblies on the lower surface of the rotor blade near the tip, a negative or nose down moment can be achieved. The magnitudes of the induced moments can be altered via the adjustment of the peak jet velocities and/or the oscillation frequencies. The adjustment of these two primary parameters of the array of zero-mass jets and, hence, the magnitude of the resulting pitching moments, will yield the desired target blade radial twist distribution for the given flight mode. For cruise flight, a second adjustment or tuning of the parameters of the arrays of oscillating air jet assemblies is required to meet the radial twist distribution, which now favors smaller twist angles near the root of the rotor blade and more negative angles near the tip of the rotor blade to achieve the maximum aerodynamic efficiency for the given flight mode. In accordance with the present invention, through the use of arrays of oscillating air jet assemblies, tiltrotor blades can be constructed to incorporate a less severe nominal twist distribution, comparable to that of conventional helicopter blades which are on the order of 9 to 15 degrees. During the hover and cruise flight modes, this nominal twist is actively altered by the pilot to yield the optimum twist distribution which guarantees the maximum aerodynamic efficiency for the particular flight mode.

In transitional or edgewise flight, the proprotors encounter physical phenomena similar to those encountered by a conventional helicopter rotor blade. These physical phenomena include compressibility effects on the advancing blades, stall effects on the retreating blades and blade-vortex interaction (BVI) on both the advancing and retreating sides of the rotor disc (in low-speed descent flight). Arrays of oscillating air jet assemblies can be properly positioned and actuated on the rotor blades for addressing the particular desired effects for the given mode of flight. For example, arrays of oscillating air jet assemblies may be activated to reduce BVI noise in low-speed descent flight.

The upper surface 247 of the fuselage and the upper surfaces 249 of the wings of the tiltrotor aircraft suffer from a phenomenon referred to as "fountain flow," caused by the rotor blades 222a. Fountain flow is initiated by the down wash flows from the rotor blades 222a impinging on the upper surfaces 249 of the wings. A loss in the net rotor lifting capability results from the down load problem which is typical of tiltrotor aircraft. Upon impinging on the upper surfaces 249 of the wings, the flow becomes dominated by the spanwise velocities which move the flow from both sides of the aircraft toward the upper surface 247. These two opposite flows meet at the longitudinal plane of symmetry of the fuselage on the upper surface 247 and form a fountain-like flow which appears to be emerging from the top surface 247 of the fuselage. Once the fountain-like flow moves upward away from the upper surface 247 of the fuselage, it is re-ingested into the rotor blades 222a by virtue of the low pressures present at both disks and the low momentum level associated with the fountain flow. In addition to the down load created by the fountain flow region above the top surface 247 of the fuselage, the re-ingestion of the circulatory flow into the rotor blades 222a results in lower hover performance and a lower lifting capability for a given power.

In accordance with the present invention, arrays of oscillating air jet assemblies are disposed near the root of each wing of the tiltrotor aircraft. The arrays are formed into two longitudinal arrays of oscillating air jet assemblies near the root of each wing and offset from the longitudinal symmetry plane of the fuselage. In hover, the wall-like effect produced by the two longitudinal arrays of oscillating air jet assemblies retards the approaching spanwise flow and forces its entrainment into the flow produced by the jets. The wall-like effect produced by the oscillating air jet assemblies retards the spanwise velocities which would otherwise move the flow from both sides of the aircraft toward the upper surface 247. In another embodiment, the arrays of oscillating air jet assemblies are configured to vector the spanwise flow at an angle toward the trailing edge of each wing such that a dominant chordwise velocity is obtained throughout the vectoring region. In this embodiment, the distribution of the arrays of oscillating air jet assemblies can be configured to emulate that of vortex generators, which are conventionally disposed on the upper surface of commercial fixed wing aircraft. By vectoring the spanwise flow toward the trailing edge of the upper surfaces of the wings, the chordwise velocity and hence the wing lift is increased, and the spanwise flow is diverted from forming a fountain-like flow region at the upper surface 247. Additionally, by accelerating the chordwise flow above the wings, the stagnation-like pressure resulting from the impingement of the rotor downwash on the upper surfaces of the wing is attenuated. The resulting download on each wing is reduced and, in turn, the net thrust produced by the rotor blades 222a is increased.

Figure 19:
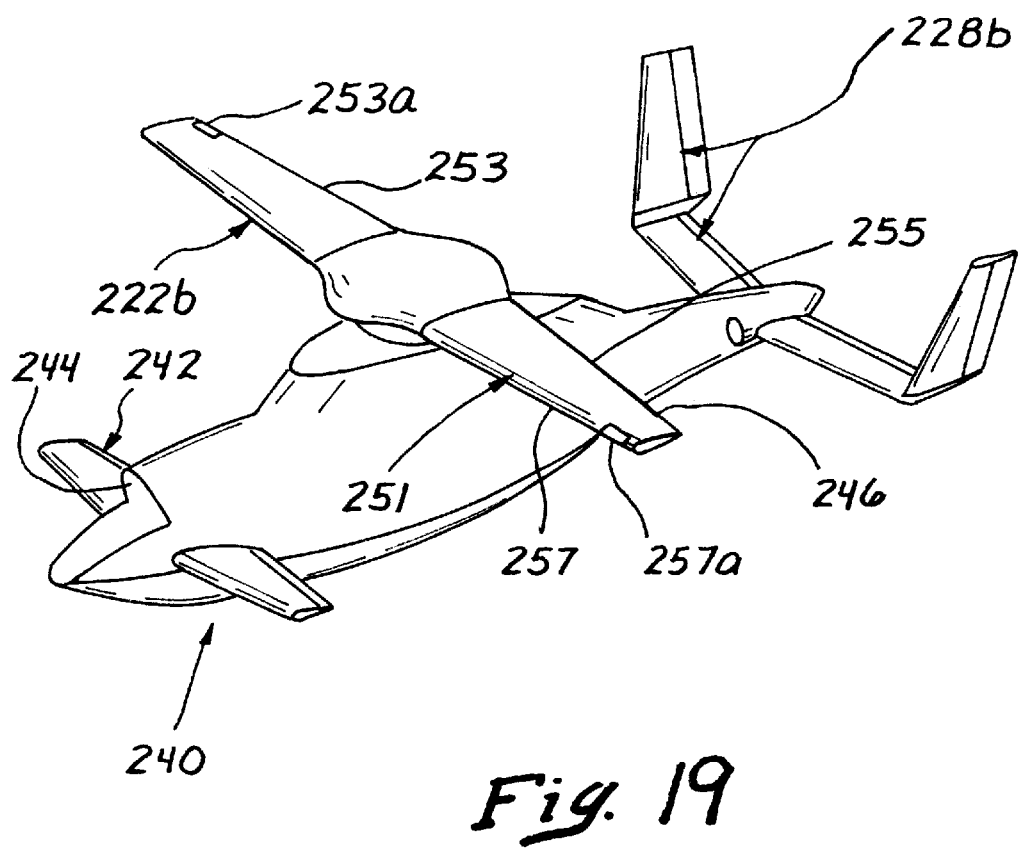
FIG. 19 illustrates a perspective view of a compound high speed rotorcraft having oscillating air jet assemblies disposed thereon.

FIG. 19 illustrates a high-speed compound aircraft 240 having oscillating air jet assemblies disposed thereon. In the figure, like elements are designated with like reference numerals followed by the letter "b." Oscillating air jet assemblies are disposed on the tail surfaces 228b and on control surfaces 242 of the canards. The positioning of the oscillating air jet assemblies on opposing sides of the aerodynamic surfaces 228b and 242 provides control surfaces without hinge lines, resulting in efficient and less complex operation. Oscillating air jets are also disposed on the nose region 244 of the high-speed compound aircraft 240. The interaction between the free stream flow and the apparent jet flow of the oscillating air jet assemblies results in a limiting stream surface which is locally smoother than the actual surface of the nose region of the aircraft. Oscillating air jet assemblies may be disposed on other aerodynamically blunt surfaces, such as the trailing edge 246 of the rotor blade 251.

The high-speed compound aircraft is illustrated having arrays of oscillating air jet assemblies disposed on various portions of the rotor blades 251. Drag on each rotor blade 251 during cruise flight dictates the maximum range of the aircraft. In accordance with the present invention, arrays of oscillating air jet assemblies are disposed along the trailing edges of each rotor blade 251 in order to reduce the base drag of the elliptic airfoil sections which form the rotor blade. In a fixed-wing cruise mode, the arrays of oscillating air jet assemblies disposed on the edges 253 and 255 are activated, and in other flight modes where the rotor blades 251 are not fixed, arrays of the oscillating air jet assemblies disposed on the edges 253 and 255 are deactivated. The apparent external jet-like flows produced by the arrays of oscillating air jet assemblies are used to energize the low energy flows immediately downstream from the trailing edges of the rotor blades 251. Oscillating air jet assemblies disposed on the edges 253a and 257a near the jet-exhaust output nozzles, contribute to the total output momentum of the nozzles and, consequently, reduce the required net mass flow through the rotor blades 251. The oscillating air jet assemblies on the edges 253a and 257a near the exhaust nozzles operate to supplement the percentage of the total momentum of mass flow through the exhaust nozzles with the momentum of the oscillating air jet assemblies due to the entrainment of the surrounding ambient air and the hot exhaust gases. Accordingly, the amount of exhaust routed through the exhaust nozzles of the rotor blades 251 can be reduced during hover, for example, and the total size of the engines can be reduced. The output momentum of the oscillating air jet assemblies can be adjusted by changing the peak jet velocities and/or the frequencies of the oscillating air jet assemblies, to thereby adjust or maintain the required rotor torque on the rotor blades 251.

Oscillating air jet assemblies disposed on rotor blades of high-speed compound aircraft, tiltrotor aircraft, or conventional helicopters are preferably engineered to withstand the harsh rotor blade environments where, for example, the components can be exposed to approximately 600G gravitational fields due to centrifugal forces. Although many of the illustrated embodiments have focussed on conventional helicopters, tiltrotor aircraft, and high-speed compound aircraft, many of the applications of the present invention can be extended to fixed wing aircraft due to the many common features of the components of the corresponding airframes, including fuselage, wings, tail surfaces, etc.

The effectiveness of the oscillating air jet assemblies as devices for lift enhancement can increase with an increase in the free stream Mach number. Close examination of the flow in the airfoil's boundary layer suggests that an underlying reason for the enhancement of lift is a favorable manipulation of the flow via the use of oscillating air jet assemblies. More robust turbulence models may be used for observing the mix between observed separated and attached boundary layer flow regions forming downstream from the location of the oscillating air jet assemblies. From a practical perspective, when strategically positioned on different aerodynamic surfaces, arrays of oscillating air jet assemblies can be used to control aircraft roll, yaw, and pitch attitudes and to reduce the pressure drag in a vicinity of blunt aerodynamic surfaces. The practical implementation of oscillating air jet assemblies for conventional rotorcraft, tiltrotor aircraft, high-speed compound aircraft, and fixed wing aircraft configurations can be enhanced as a result of physically compact designs, low power requirements, and high performance factors.

The oscillating air jet assemblies can be deactivated or operated at new conditions, such as peak jet velocity and oscillation frequency, for other flight conditions, depending upon the desired effect. The oscillating air jet assemblies of the present invention can also be activated and deactivated for purposes such as lift augmentation during maneuvering flight, retreating blade lift enhancement during high-speed forward flight, and vibration reduction. The oscillating air jet assemblies of the present invention may also be used to address aerodynamic/dynamic blade twist modifications.

Although exemplary embodiments of the invention have been shown and described, many other changes, modifications and substitutions, in addition to those set forth in the above paragraphs, may be made by one having ordinary skill in the art with out necessarily departing from the spirit and scope of this invention.

What is claimed is:

1. A rotor blade control system for dynamically adjusting a blade radial twist of a rotor blade of an aircraft, the rotor blade having an outer skin and an interior volume, the blade radial twist being adjusted in accordance with at least one of a first operating flight mode of the aircraft and a second operating flight mode of the aircraft, the rotor blade control system comprising:

at least one aperture disposed in the outer skin, the at least one aperture connecting the outer skin to the interior volume;

at least one diaphragm disposed within the interior volume, the at least one diaphragm being movable between a first position and a second position, wherein movement of the at least one diaphragm from the first position to the second position pushes air through the at least one aperture and out of the interior volume, and wherein movement of the at least one diaphragm from the second position to the first position draws air through the at least one aperture and into the interior volume; and a controller operatively coupled to the at least one diaphragm, the controller being adapted to control an operation of the at least one diaphragm in accordance with an operating flight mode of the aircraft, wherein the controller operates the at least one diaphragm in a first operating mode when the rotor blade is in the first operating flight mode, and wherein the controller operates the at least one diaphragm in a second operating mode when the rotor blade is in the second operating flight mode.

2. The rotor blade control system as recited in claim 1, wherein:

the controller operates the at least one diaphragm to impart a first total radial twist on the rotor blade when the rotor blade is in the first operating flight mode;

the controller operates the at least one diaphragm to impart a second total radial twist on the rotor blade when the rotor blade is in the second operating flight mode; and the first total radial twist is not equal to the second total radial twist.

3. The rotor blade control system as recited in claim 1, wherein:

the at least one aperture comprises a plurality of apertures; and the at least one diaphragm comprises a plurality of diaphragms.

4. The rotor blade control system as recited in claim 3, wherein:

a total number of apertures corresponds to a total number of diaphragms; and each diaphragm is adapted to direct air through a single corresponding aperture.

5. The rotor blade control system as recited in claim 3, wherein:

the controller operates the plurality of diaphragms to impart a first total radial twist on the rotor blade when the rotor blade is in the first operating flight mode; and the controller operates the plurality of diaphragms to impart a second total radial twist on the rotor blade when the rotor blade is in the second operating flight mode, the first total radial twist being different from the second total radial twist.

6. The rotor blade control system as recited in claim 3, wherein:

a first portion of the plurality of apertures is disposed in a vicinity of a root of the rotor blade;

a first portion of the plurality of diaphragms is disposed in a vicinity of a root of the rotor blade;

a second portion of the plurality of apertures is disposed in a vicinity of a tip of the rotor blade; and a second portion of the plurality of diaphragms is disposed in a vicinity of a tip of the rotor blade.

7. The rotor blade control system as recited in claim 6, wherein:

the rotor blade comprises an upper surface and a lower surface;

the first portion of the plurality of apertures is disposed on the upper surface of the rotor blade; and the second portion of the plurality of apertures is disposed on the lower surface of the rotor blade.

8. The rotor blade control system as recited in claim 7, wherein:

the controller operates the first and second portions of the plurality of diaphragms to impart a first total radial twist on the rotor blade when the rotor blade is in the first operating flight mode; and the controller operates the first and second portions of the plurality of diaphragms to impart a second total radial twist on the rotor blade when the rotor blade is in the second operating flight mode, the first total radial twist being different from the second total radial twist.

9. The rotor blade control system as recited in claim 8, wherein:

the controller changes an oscillation frequency of at least one of the first and second portions of the plurality of diaphragms, to change between the first operating flight mode and the second operating flight mode.

10. The rotor blade control system as recited in claim 8, wherein:
the controller changes an oscillation magnitude of at least one of the first and second portions of the plurality of diaphragms, to change between the first operating flight mode and the second operating flight mode.

11. The rotor blade control system as recited in claim 10, wherein the aircraft comprises a tiltrotor aircraft.

12. The rotor blade control system as recited in claim 11, wherein:
the first operating flight mode comprises a hover mode; and
the second operating flight mode comprises a cruise mode.

13. The rotor blade control system as recited in claim 11, wherein:
the first operating flight mode comprises a hover mode; and
the second operating flight mode comprises a high-speed cruise mode.

14. The rotor blade control system as recited in claim 11, wherein the controller is operable by a pilot, whereby the pilot can operate the controller to implement the first operating flight mode for hovering the aircraft, and whereby the pilot can operate the controller to implement the second operating flight mode for forward flight of the aircraft.

15. A rotor blade control system for dynamically reducing a vibration level of a rotor hub of an aircraft, the rotor hub being adapted to hold at least one rotor blade, the rotor blade having an outer surface, an interior volume, a root, and a tip, the rotor blade control system comprising:
at least one aperture disposed on the rotor blade near the root, the at least one aperture connecting the outer surface to the interior volume;
at least one diaphragm disposed within the interior volume, the at least one diaphragm being adapted to oscillate between a first position and a second position, wherein movement of the at least one diaphragm from the first position to the second position pushes air through the at least one aperture and out of the interior volume, and wherein movement of the at least one diaphragm from the second position to the first position draws air through the at least one aperture and into the interior volume; and
a controller operatively coupled to the at least one diaphragm, the controller being adapted to change an oscillation parameter of the diaphragm, based on a rotational position of the at least one rotor blade.

16. The rotor blade control system as recited in claim 15, wherein the oscillation parameter comprises an oscillation frequency of the at least one diaphragm.

17. The rotor blade control system as recited in claim 15, wherein the oscillation parameter comprises an oscillation magnitude of the at least one diaphragm.

18. The rotor blade control system as recited in claim 15, wherein:
the outer surface comprises an upper surface and a lower surface; and
the at least one aperture comprises at least one upper aperture disposed on the upper surface and at least one lower aperture disposed on the lower surface;
the at least one upper aperture connects the upper surface to the interior volume; and
the at least one lower aperture connects the lower surface to the interior volume.

19. The rotor blade control system as recited in claim 18, wherein:
the controller alternates between activating the at least one diaphragm in a first energization mode and activating the at least one diaphragm in a second energization mode;
the first energization mode comprises a first oscillation frequency and a first oscillation magnitude;
the second energization mode comprises a second oscillation frequency and a second oscillation magnitude; and
the first energization mode is not equal to the second energization mode.

20. The rotor blade control system as recited in claim 19, wherein the controller activates the at least one diaphragm in a manner to generate an alternating mean torsional moment and to reduce rotor hub vibration.

21. The rotor blade control system as recited in claim 19, wherein the controller activates the at least one diaphragm in a manner to emulate aerodynamics associated with blade root pitch.

22. The rotor blade control system as recited in claim 18, wherein:
the at least one diaphragm comprises at least one upper diaphragm and at least one lower diaphragm;
the at least one upper diaphragm is adapted to direct air only through the at least one upper aperture; and
the at least one lower diaphragm is adapted to direct air only through the at least one upper aperture.

23. The rotor blade control system as recited in claim 22, wherein the controller is operatively coupled to the at least one upper diaphragm and the at least one lower diaphragm, the controller being adapted to change oscillation parameters of the at least one upper diaphragm and the at least one lower diaphragm, based on a rotational position of the at least one rotor blade.

24. The rotor blade control system as recited in claim 23, wherein:
the controller is adapted to change an oscillation parameter of the at least one upper diaphragm at a given rotational position of the rotor blade;
the controller is adapted to change an oscillation parameter of the at least one lower diaphragm at the given rotational position of the rotor blade; and
the change in oscillation parameter of the at least one upper diaphragm at the given rotational position of the rotor blade is not equal to the change in oscillation parameter of the at lest one lower diaphragm at the given rotational position.

25. The rotor blade control system as recited in claim 24, wherein:
the at least one upper aperture comprises a plurality of upper apertures; and
the at least one lower aperture comprises a plurality of lower apertures.

26. The rotor blade control system as recited in claim 25, wherein:
the at least one upper diaphragm is adapted to direct air only through the plurality of upper apertures; and
the at least one lower diaphragm is adapted to direct air only through the plurality of lower apertures.

27. The rotor blade control system as recited in claim 26, wherein:

the at least one upper diaphragm comprises a plurality of upper diaphragms;

the at least one lower diaphragm comprises a plurality of lower diaphragms;

a total number of upper apertures corresponds to a total number of upper diaphragms;

a total number of lower apertures corresponds to a total number of lower diaphragms;

each upper diaphragm is adapted to direct air through a single corresponding upper aperture; and each lower diaphragm is adapted to direct air through a single corresponding lower aperture.

28. The rotor blade control system as recited in claim 27, wherein:

the controller alternates between activating the plurality of upper diaphragms and activating the plurality of lower diaphragms during each rotation of the rotor blade;

the controller activates the plurality of upper diaphragms and the plurality of lower diaphragms in a manner to generate an alternating mean torsional moment and to reduce rotor hub vibration.

29. The rotor blade control system as recited in claim 27, wherein:

the controller alternates between activating the plurality of upper diaphragms and activating the plurality of lower diaphragms during each rotation of the rotor blade;

the controller activates the plurality of upper diaphragms and the plurality of lower diaphragms in a manner to emulate aerodynamics associated with blade root pitch.

30. A rotor blade control system for dynamically reducing a vibration level of a rotor hub of an aircraft, the rotor hub being adapted to hold at least one rotor blade, the rotor blade having an upper surface, a lower surface, an interior volume, a root, and a tip, the rotor blade control system comprising:

a plurality of upper apertures disposed along a length of the upper surface, the plurality of upper apertures connecting the upper surface to the interior volume;

a plurality of lower apertures disposed along a length of the lower surface, the plurality of lower apertures connecting the lower surface to the interior volume;

at least one upper diaphragm adapted to direct air through the plurality of upper apertures;

at least one lower diaphragm adapted to direct air through the plurality of lower apertures; and a controller operatively coupled to the at least one upper diaphragm and the at least one lower diaphragm, the controller being adapted to activate the at least one upper diaphragm and the at least one lower diaphragm in a manner to generate an alternating mean torsional moment and to reduce rotor hub vibration;

wherein the controller is adapted to change an oscillation parameter of at least one of the plurality of upper apertures, based on a rotational position of the at least one rotor blade; and wherein the controller is adapted to change an oscillation parameter of at least one of the plurality of lower apertures, based on a rotational position of the at least one rotor blade.

31. The rotor blade control system as recited in claim 30, wherein:

the at least one upper diaphragm comprises a plurality of upper diaphragms;

the at least one lower diaphragm comprises a plurality of lower diaphragms;

each of the plurality of upper diaphragms is adapted to direct air only through a corresponding one of the plurality of upper apertures; and each of the plurality of lower diaphragms is adapted to direct air only through a corresponding one of the plurality of lower apertures.

32. The rotor blade control system as recited in claim 30, wherein the controller activates the at least one upper diaphragm and the at least one lower diaphragm in a manner to emulate aerodynamics associated with blade root pitch.

33. The rotor blade control system as recited in claim 32, wherein:

the controller is adapted to change an oscillation parameter of the at least one upper diaphragm at a given rotational position of the rotor blade;

the controller is adapted to change an oscillation parameter of the at least one lower diaphragm at the given rotational position of the rotor blade; and the change in oscillation parameter of the at lest one upper diaphragm at the given rotational position of the rotor blade is not equal to the change in oscillation parameter of the at lest one lower diaphragm at the given rotational position.

34. An active control device for reducing a fountain flow phenomena on a structure of a tiltrotor aircraft, the structure having an outer wing surface and an interior volume, the active control device comprising:

at least one aperture disposed in the outer wing surface of the tiltrotor aircraft, the at least one aperture connecting the outer aerodynamically blunt surface to the interior volume; and at least one diaphragm disposed in the interior volume, the at least one diaphragm being movable between a first position and a second position, wherein movement of the at least one diaphragm from the first position to the second position pushes air through the at least one aperture and out of the interior volume, and wherein movement of the at least one diaphragm from the second position to the first position draws air through the at least one aperture and into the interior volume.

35. The active control device as recited in claim 34, wherein the outer wing surface is disposed above a fuselage of the tiltrotor aircraft.

36. The active control device as recited in claim 35, wherein:

the at least one aperture comprises a plurality of apertures; and the at least one diaphragm comprises a plurality of diaphragms.

37. The active control device as recited in claim 36, wherein:

the outer wing surface joins a first wing of the tiltrotor aircraft to a second wing of the tiltrotor aircraft; and the at least one aperture comprises a plurality of apertures disposed on the outer wing surface;

each diaphragm comprises a center point;

the center point of each diaphragm moves along a corresponding diaphragm axis as the diaphragm moves between the first position and the second position; and each diaphragm axis has a vertical component pointing out of the outer wing surface and a horizontal component pointing toward a trailing edge of the outer wing surface.

38. The active control device as recited in claim 35, wherein:
  the outer wing surface joins a first wing of the tiltrotor aircraft to a second wing of the tiltrotor aircraft; and
  the at least one aperture comprises a first plurality of apertures disposed along a root of the first wing and a second plurality of apertures disposed along a root of the second wing.

39. The active control device as recited in claim 38, wherein:
  the first plurality of apertures is offset from a longitudinal symmetry plane of. the fuselage of the tiltrotor aircraft;
  the second plurality of apertures is offset from a longitudinal symmetry plane of the fuselage of the tiltrotor aircraft; and
  the first plurality of apertures and the second plurality of apertures are adapted to retard a download on the outer wing surface.

40. The active control device as recited in claim 39, wherein the first plurality of apertures and the second plurality of apertures are adapted to retard a download on the outer wing surface while the tiltrotor aircraft is in hover.

41. The active control device as recited in claim 39, wherein:
  each diaphragm comprises a center point;
  the center point of each diaphragm moves along a corresponding diaphragm axis as the diaphragm moves between the first position and the second position; and
  each diaphragm axis is substantially normal to the outer wing surface.

42. The active control device as recited in claim 41, wherein:
  each diaphragm comprises a center point;
  the center point of each diaphragm moves along a corresponding diaphragm axis as the diaphragm moves between the first position and the second position; and
  each diaphragm axis has a vertical component pointing out of the outer wing surface, a tangential component parallel to the wing leading edge and a horizontal component pointing toward a trailing edge of the outer wing surface.

43. The active control device as recited in claim 41, wherein a chordwise velocity toward the trailing edge of the outer wing surface is increased, compared to a chordwise velocity toward the trailing edge of the outer wing surface in an absence of diaphragms on the outer wing surface.

44. An active control device for increasing an efficiency of a jet-exhaust driven rotor blade of an aircraft, the active control device comprising:
  a rotor blade having a first end, a second end, and a rotational axis centered between the first end and the second end, the first end having a first outer surface and a first interior volume, and the second end having a second outer surface and a second interior volume;
  a first tip-exhaust port disposed at the first end of the rotor blade;
  at least one first aperture disposed in close proximity to the first tip-exhaust port, the at least one first aperture connecting the first outer surface to interior volume;
  at least one first diaphragm disposed in the interior volume, the at least one first diaphragm being movable between a first position and a second position, wherein movement of the at least one first diaphragm from the first position to the second position pushes air through the at least one first aperture and out of the interior volume, and wherein movement of the at least one first diaphragm from the second position to the first position draws air through the at least one first aperture and into the interior volume;
  a second tip-exhaust port disposed at the second end of the rotor blade;
  at least one second aperture disposed in close proximity to the second tip-exhaust port, the at least one second aperture connecting the second outer surface to interior volume;
  at least one second diaphragm disposed in the interior volume, the at least one second diaphragm being movable between a first position and a second position, wherein movement of the at least one second diaphragm from the first position to the second position pushes air through the at least one second aperture and out of the interior volume, and wherein movement of the at least one second diaphragm from the second position to the first position draws air through the at least one second aperture and into the interior volume.

45. The active control device as recited in claim 44, wherein:
  the at least one first aperture comprises a plurality of first apertures;
  the at least one diaphragm comprises a plurality of first diaphragms;
  the at least one second aperture comprises a plurality of second apertures; and
  the at least one second diaphragm comprises a plurality of second diaphragms.

46. The active control device as recited in claim 45, wherein:
  each diaphragm comprises a center point;
  the center point of each diaphragm moves along a corresponding diaphragm axis as the diaphragm moves between the first position and the second position; and
  each diaphragm axis is substantially parallel to a chord direction of the rotor blade.

47. The active control device as recited in claim 45, wherein:
  a total number of the plurality of first apertures is equal to a total number of the plurality of first diaphragms; and
  a total number of the plurality of second apertures is equal to a total number of the plurality of second diaphragms.

48. An active control device for reducing drag on an aerodynamically blunt structure, the aerodynamically blunt structure having an aerodynamically blunt surface and an interior volume, the active control device comprising:
  at least one aperture disposed in close proximity to the aerodynamically blunt surface, the aerodynamically blunt surface being defined as a surface which is substantially normal to a direction of forward flight, the at least one aperture connecting the outer aerodynamically blunt surface to the interior volume; and
  a diaphragm disposed in the interior volume, the diaphragm being movable between a first position and a second position, wherein movement of the diaphragm from the first position to the second position pushes air through the at least one aperture and out of the interior volume, and wherein movement of the diaphragm from the second position to the first position draws air through the at least one aperture and into the interior volume.

49. The active control device as recited in claim 48, wherein the at least one aperture is disposed on the aerodynamically blunt surface.

50. The active control device as recited in claim 48, wherein the aerodynamically blunt structure comprises a trailing edge of an airfoil.

51. The active control device as recited in claim 48, wherein the aerodynamically blunt structure comprises a leading edge of an airfoil.

52. The active control device as recited in claim 48, wherein the aerodynamically blunt structure comprises a nose region of an aircraft.

53. The active control device as recited in claim 48, wherein the at least one aperture comprises a plurality of apertures.

54. The active control device as recited in claim 53, wherein:

the diaphragm comprises a first diaphragm, and the active control device further comprises a second diaphragm.

55. The active control device as recited in claim 53, wherein:

the diaphragm comprises a first diaphragm, and the active control device further comprises a plurality of diaphragms.

56. The rotor blade control system as recited in claim 55, wherein:

a total number of apertures corresponds to a total number of diaphragms; and each diaphragm is adapted to direct air through a single corresponding aperture.

57. An active control device for reducing upsweep drag of an aerodynamically blunt structure, the aerodynamically blunt structure having an aerodynamically blunt surface and an interior volume, the active control device comprising:

at least one aperture disposed in close proximity to the aerodynamically blunt surface, the aerodynamically blunt surface being defined as a surface forming at least about a 30 degree angle with a direction of forward flight, the at least one aperture connecting the outer aerodynamically blunt surface to the interior volume; and a diaphragm disposed in the interior volume, the diaphragm being movable between a first position and a second position, wherein movement of the diaphragm from the first position to the second position pushes air through the at least one aperture and out of the interior volume, and wherein movement of the diaphragm from the second position to the first position draws air through the at least one aperture and into the interior volume.

58. The active control device as recited in claim 57, wherein the aerodynamically blunt surface comprises a trailing portion of a fuselage of an aircraft.

59. An active control device for vectoring engine exhaust of an aircraft to reduce exhaust-related momentum drag of an aerodynamic structure of the aircraft, the aerodynamic structure having an outer aerodynamic surface and an interior volume, the active control device comprising:

at least one aperture disposed on the aerodynamic surface in close proximity to an engine exhaust of the aircraft, the at least one aperture connecting the outer aerodynamic surface to the interior volume;

a diaphragm disposed in the interior volume, the diaphragm having a center point and an outer periphery, the outer periphery being adapted to be coupled to the outer aerodynamic surface;

a wall coupled to the diaphragm; and a wire wound around the wall;

whereby the diaphragm is movable between a first position and a second position, wherein movement of the diaphragm from the first position to the second position pushes air through the at least one aperture and out of the interior volume, and wherein movement of the diaphragm from the second position to the first position draws air through the at least one aperture and into the interior volume; and whereby the center point of the diaphragm moves along a diaphragm axis of the diaphragm as the diaphragm moves between the first position and the second position, the diaphragm axis intersecting exhaust from the engine exhaust of the aircraft and the movement of the diaphragm vectoring the exhaust.

60. The active control device as recited in claim 59, wherein the diaphragm vectors the exhaust in order to reduce an exhaust-related momentum drag associated with a component of momentum of the exhaust which is normal to that of free stream.

61. The active control device as recited in claim 59, wherein the diaphragm vectors the exhaust in order adjust an exhaust flow to reduce an amount of interaction between the exhaust and a tail surface of the aircraft.

62. The active control device as recited in claim 59, wherein:

the diaphragm comprises an oval shape; and the wall comprises a cylindrical shape with an oval cross-section.

63. The active control device as recited in claim 59, wherein:

the diaphragm comprises a first surface and a second surface opposite to the first surface; and the wall is coupled to the second surface of the diaphragm, the wall having a center and a perimeter, whereby the centers of the diaphragm and the wall are placed into close proximity when the wall is coupled to the second surface of the diaphragm, and whereby the perimeter of the wall does not extend beyond the perimeter of the diaphragm when the wall is coupled to the second surface of the diaphragm.

64. The active control device as recited in claim 63, and further comprising a magnetic field producing member disposed around both the wall and the coil, whereby the wall and the coil are movable within the magnetic field producing member to thereby facilitate movement of the diaphragm.

65. The active control device as recited in claim 59, wherein:

the diaphragm further comprises an inner periphery; and the active control device further comprises a rigid piston connected to the inner periphery of the diaphragm.

66. The active control device as recited in claim 65, wherein the rigid piston is disposed in an opposing fashion to and in close proximity to the outer aerodynamic surface.

67. The active control device as recited in claim 65 and further comprising a flexible diaphragm coupling the rigid piston to the outer aerodynamic surface.

68. The active control device as recited in claim 65, wherein:

the diaphragm comprises an oval shape;

the wall comprises a cylindrical shape with an oval cross-section; and the rigid piston comprises an oval shape.

69. The active control device as recited in claim 59, wherein:

the wall comprises a first maximum diameter;

the rigid piston comprises a second maximum diameter; and a ratio of the first maximum diameter to the second maximum diameter is lees than or equal to about one half.

70. The active control device as recited in claim 59, wherein the at least one aperture comprises a plurality of apertures.

71. The active control device as recited in claim 70, wherein:

the diaphragm comprises a first diaphragm, and the active control device further comprises a second diaphragm.

72. The active control device as recited in claim 70, wherein:

the diaphragm comprises a first diaphragm, and the active control device further comprises a plurality of diaphragms.

73. The rotor blade control system as recited in claim 72, wherein:

a total number of apertures corresponds to a total number of diaphragms; and each diaphragm is adapted to direct air through a single corresponding aperture.

74. The active control device as recited in claim 59, wherein the diaphragm comprises nickel hydroform.

75. An active control device for mixing engine exhaust of an aircraft to reduce an infrared signature of the aircraft, the aircraft having an outer aerodynamic surface and an interior volume, the active control device comprising:

at least one aperture disposed on the aerodynamic surface in close proximity to an engine exhaust, the at least one aperture connecting the outer aerodynamic surface to the interior volume;

a diaphragm disposed in the interior volume, the diaphragm having a center point and an outer periphery, the outer periphery being adapted to be coupled to the outer aerodynamic surface;

a wall coupled to the diaphragm; and a wire wound around the wall;

whereby the diaphragm is movable between a first position and a second position, wherein movement of the diaphragm from the first position to the second position pushes air through the at least one aperture and out of the interior volume, and wherein movement of the diaphragm from the second position to the first position draws air through the at least one aperture and into the interior volume; and whereby the center point of the diaphragm moves along a diaphragm axis of the diaphragm as the diaphragm moves between the first position and the second position, the diaphragm axis intersecting exhaust from the engine exhaust of the aircraft and the movement of the diaphragm efficiently mixing the exhaust with ambient air to reduce the infrared signature of the aircraft.

76. The active control device as recited in claim 75, wherein:

the diaphragm comprises an oval shape; and the wall comprises a cylindrical shape with an oval cross-section.

77. The active control device as recited in claim 75, wherein:

the diaphragm comprises a first surface and a second surface opposite to the first surface; and the wall is coupled to the second surface of the diaphragm, the wall having a center and a perimeter, whereby the centers of the diaphragm and the wall are placed into close proximity when the wall is coupled to the second surface of the diaphragm, and whereby the perimeter of the wall does not extend beyond the perimeter of the diaphragm when the wall is coupled to the second surface of the diaphragm.

78. The active control device as recited in claim 77, and further comprising a magnetic field producing member disposed around both the wall and the coil, whereby the wall and the coil are movable within the magnetic field producing member to thereby facilitate movement of the diaphragm.

79. The active control device as recited in claim 75, wherein:

the diaphragm further comprises an inner periphery;

the active control device further comprises a rigid piston connected to the inner periphery of the diaphragm; and the rigid piston is disposed in an opposing fashion to and in close proximity to the outer aerodynamic surface.

80. The active control device as recited in claim 79, and further comprising a flexible diaphragm coupling the rigid piston to the outer aerodynamic surface.

81. The active control device as recited in claim 79, wherein:

the diaphragm comprises an oval shape;

the wall comprises a cylindrical shape with an oval cross-section; and the rigid piston comprises an oval shape.

82. The active control device as recited in claim 79, wherein:

the wall comprises a first maximum diameter;

the rigid piston comprises a second maximum diameter; and a ratio of the first maximum diameter to the second maximum diameter is less than or equal to about one half.

83. The active control device as recited in claim 75, wherein the at least one aperture comprises a plurality of apertures.

84. The active control device as recited in claim 83, wherein:

the diaphragm comprises a first diaphragm, and the active control device further comprises a plurality of diaphragms.

85. The rotor blade control system as recited in claim 84, wherein:

a total number of apertures corresponds to a total number of diaphragms; and each diaphragm is adapted to direct air through a single corresponding aperture.

86. The active control device as recited in claim 75, wherein the diaphragm comprises nickel hydroform.

87. An active control device for reducing drag associated with a control surface and for operating a control surface in an absence of a trailing edge flap, the control surface having an upper outer surface, a lower outer surface, and an interior volume, the active control device comprising:

a plurality of upper apertures disposed on the upper outer surface, the plurality of upper apertures connecting the upper outer surface to the interior volume;

a plurality of lower apertures disposed on the lower outer surface, the plurality of lower apertures connecting the lower outer surface to the interior volume;

at least one upper diaphragm adapted to direct air through the plurality of upper apertures;

at least one lower diaphragm adapted to direct air through the plurality of lower apertures;

a controller operatively coupled to the at least one upper diaphragm and the at least one lower diaphragm, the controller being adapted to operate the control surface in the absence of a trailing edge flap by activating and deactivating the at least one upper diaphragm and the at least one lower diaphragm.

88. The active control device as recited in claim 87, wherein:

an upper center point of the at least one upper diaphragm moves along an upper diaphragm axis of the upper diaphragm as the upper diaphragm moves between a first position and a second position, the upper diaphragm axis being substantially normal to the control surface; and a lower center point of the at least one lower diaphragm moves along a lower diaphragm axis of the lower diaphragm as the lower diaphragm moves between a first position and a second position, the lower diaphragm axis being substantially normal to the control surface.

89. The active control device as recited in claim 87, wherein:

the at least one upper diaphragm comprises a plurality of upper diaphragms;

the at least one lower diaphragm comprises a plurality of lower diaphragms;

each of the plurality of upper diaphragms is adapted to direct air only through a corresponding one of the plurality of upper apertures; and each of the plurality of lower diaphragms is adapted to direct air only through a corresponding one of the plurality of lower apertures.

90. An active control device for improving an air flow characteristic in a vicinity of an engine inlet of an a aircraft, the aircraft having an outer aerodynamic surface and an interior volume, the active control device comprising:

at least one aperture disposed on the aerodynamic surface in close proximity to the engine inlet, the at least one aperture connecting the outer aerodynamic surface to the interior volume;

a diaphragm disposed in the interior volume, the diaphragm having a center point and an outer periphery, the outer periphery being adapted to be coupled to the outer aerodynamic surface;

whereby the diaphragm is movable between a first position and a second position, wherein movement of the diaphragm from the first position to the second position pushes air through the at least one aperture and out of the interior volume, and wherein movement of the diaphragm from the second position to the first position draws air through the at least one aperture and into the interior volume; and whereby the center point of the diaphragm moves along a diaphragm axis of the diaphragm as the diaphragm moves between the first position and the second position, the diaphragm axis intersecting a path of air flow into the engine inlet and the movement of the diaphragm attenuating a flow non-uniformity of air entering the engine inlet relative to a flow non-uniformity of air entering the engine inlet in an absence of the diaphragm.

91. The active control device as recited in claim 90, and further comprising:

a wall coupled to the diaphragm; and a wire wound around the wall.

92. The active control device as recited in claim 90, wherein:

the outer aerodynamic surface comprises an inlet cowling; and the diaphragm is disposed on the inlet cowling.

93. The active control device as recited in claim 90, wherein movement of the diaphragm locally adjusts a flow angle of air into the engine inlet and improves an efficiency of the engine by minimizing losses associated with air flow non-uniformity in a vicinity of the engine inlet.

94. The active control device as recited in claim 90, wherein:

the at least one aperture comprises a plurality of apertures;

the diaphragm comprises a first diaphragm, and the active control device further comprises a plurality of diaphragms.

95. The rotor blade control system as recited in claim 94, wherein:

a total number of apertures corresponds to a total number of diaphragms; and each diaphragm is adapted to direct air through a single corresponding aperture.

96. The rotor blade control system as recited in claim 95, wherein oscillation frequencies of the plurality of diaphragms are locally adjusted in order to attenuate a flow non-uniformity of air entering the engine inlet.

97. The rotor blade control system as recited in claim 95, wherein oscillation magnitudes of the plurality of diaphragms are locally adjusted in order to attenuate a flow non-uniformity of air entering the engine inlet.

98. The rotor blade control system as recited in claim 95, and further comprising a controller operatively coupled to the plurality of diaphragms, the controller being adapted to control an operation of the plurality of diaphragms in order to attenuate a flow non-uniformity of air entering the engine inlet.

99. The rotor blade control system as recited in claim 98, wherein:

the rotor blade control system further comprises at least one air flow detector operatively coupled to the controller;

the at least one air flow detector is adapted to measure a flow characteristic of air in a vicinity of the engine inlet; and the controller is adapted to control an operation of the plurality of diaphragms in order to attenuate a flow non-uniformity of air entering the engine inlet.

100. The rotor blade control system as recited in claim 99, wherein the controller is adapted to change an oscillation frequency of at least one of the plurality of diaphragms in response to a flow characteristic of air measured by the flow detector.

101. The rotor blade control system as recited in claim 100, wherein the controller changes an oscillation magnitude of at least one of the plurality of diaphragms in response to a flow characteristic of air measured by the flow detector.

102. The active control device as recited in claim 90, wherein:

the diaphragm comprises an oval shape; and the wall comprises a cylindrical shape with an oval cross-section.

103. The active control device as recited in claim 90, wherein:

the diaphragm comprises a first surface and a second surface opposite to the first surface; and the wall is coupled to the second surface of the diaphragm, the wall having a center and a perimeter, whereby the centers of the diaphragm and the wall are placed into close proximity when the wall is coupled to the second surface of the diaphragm, and whereby the perimeter of the wall does not extend beyond the perimeter of the diaphragm when the wall is coupled to the second surface of the diaphragm.

104. The active control device as recited in claim 103, and further comprising a magnetic field producing member disposed around both the wall and the coil, whereby the wall and the coil are movable within the magnetic field producing member to thereby facilitate movement of the diaphragm.

105. The active control device as recited in claim 90, wherein:

the diaphragm further comprises an inner periphery;

the active control device further comprises a rigid piston connected to the inner periphery of the diaphragm; and the rigid piston is disposed in an opposing fashion to and in close proximity to the outer aerodynamic surface.

106. The active control device as recited in claim 105, and further comprising a flexible diaphragm coupling the rigid piston to the outer aerodynamic surface.

107. The active control device as recited in claim 105, wherein:

the diaphragm comprises an oval shape;

the wall comprises a cylindrical shape with an oval cross-section; and the rigid piston comprises an oval shape.

108. The active control device as recited in claim 105, wherein:

the wall comprises a first maximum diameter;

the rigid piston comprises a second maximum diameter; and a ratio of the first maximum diameter to the second maximum diameter is lees than or equal to about one half.

109. The active control device as recited in claim 90, wherein the diaphragm comprises a nickel hydroform.

110. The active control device as recited in claim 90, wherein the at least one aperture comprises a plurality of apertures.

111. The active control device as recited in claim 110, wherein:

the diaphragm comprises a first diaphragm, and the active control device further comprises a plurality of diaphragms.

\* \* \* \* \*